United States Patent
Allibhai

(10) Patent No.: US 11,315,570 B2
(45) Date of Patent: Apr. 26, 2022

(54) MACHINE LEARNING-BASED SPEECH-TO-TEXT TRANSCRIPTION CLOUD INTERMEDIARY

(71) Applicant: Simon Says, Inc., Walnut Creek, CA (US)

(72) Inventor: Shamir Allibhai, San Francisco, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 152 days.

(21) Appl. No.: 16/373,503

(22) Filed: Apr. 2, 2019

(65) Prior Publication Data

US 2019/0341052 A1    Nov. 7, 2019

Related U.S. Application Data

(60) Provisional application No. 62/666,050, filed on May 2, 2018, provisional application No. 62/666,017, filed on May 2, 2018, provisional application No. 62/666,025, filed on May 2, 2018.

(51) Int. Cl.
| | |
|---|---|
| *G10L 15/32* | (2013.01) |
| *G10L 15/30* | (2013.01) |
| *G10L 15/22* | (2006.01) |
| *G10L 21/028* | (2013.01) |
| *G10L 25/90* | (2013.01) |
| *G10L 25/84* | (2013.01) |
| *G10L 15/26* | (2006.01) |
| *G10L 17/02* | (2013.01) |
| *G10L 21/0208* | (2013.01) |

(52) U.S. Cl.
CPC .............. *G10L 15/30* (2013.01); *G10L 15/22* (2013.01); *G10L 21/028* (2013.01); *G10L 25/84* (2013.01); *G10L 25/90* (2013.01); *G10L 15/26* (2013.01); *G10L 15/32* (2013.01); *G10L 17/02* (2013.01); *G10L 21/0208* (2013.01)

(58) Field of Classification Search
CPC ......... G10L 15/32; G10L 15/30; G10L 15/26; G10L 17/02; G10L 21/0208
See application file for complete search history.

(56) References Cited

U.S. PATENT DOCUMENTS

| | | | | |
|---|---|---|---|---|
| 2002/0069055 | A1* | 6/2002 | Tang .................. | G10L 15/26 704/235 |
| 2003/0115053 | A1* | 6/2003 | Eide .................. | G10L 17/26 704/231 |
| 2011/0119060 | A1* | 5/2011 | Aronowitz .............. | G10L 17/12 704/250 |

(Continued)

OTHER PUBLICATIONS

Chaubard, et al., "CS 224D: Deep Learning for NLP: Lecture Notes: Part I, Part II, Part III, Part IV, and Part V", 2015, 54 pages.

(Continued)

*Primary Examiner* — Feng-Tzer Tzeng
(74) *Attorney, Agent, or Firm* — FisherBroyles, LLP

(57) ABSTRACT

The technology disclosed relates to a machine learning based speech-to-text transcription intermediary which, from among multiple speech recognition engines, selects a speech recognition engine for accurately transcribing an audio channel based on sound and speech characteristics of the audio channel.

16 Claims, 17 Drawing Sheets

(56) References Cited

U.S. PATENT DOCUMENTS

2015/0194152 A1\* 7/2015 Katuri .................... G10L 15/30
  704/231

OTHER PUBLICATIONS

Arik, et. al., "Deep Voice: Real time Neural Text to Speech", Mar. 7, 2017, 17pgs.
Goodfellow, et. al., "Deep Learing Chapter 9 Convolutional Networks", 2016, 41 pages.
Van Den Oord, et. al.,"WaveNet: A Generative Model for Raw Audio", Sep. 19, 2016, 15 pages.
Wu, Jianxin, "Introduction to Convolutional Neural Networks", May 1, 2017, 31pages.

\* cited by examiner

FIG. 2 – Computer System

Residual Block and Skip-Connections used in Convolutional Neural Networks

Batch Normalization Forward Pass with Convolutional Neural Networks $$\mu_B = \frac{1}{n}\sum_{i=1}^{n} x_i^{(\ell-1)}$$

$$\sigma_B^2 = \frac{1}{n}\sum_{i=1}^{n} (x_i^{(\ell-1)} - \mu_B)^2$$

$$\hat{x}^{(\ell-1)} = \frac{x^{(\ell-1)} - \mu_B}{\sqrt{\sigma_B^2 + \epsilon}}$$

$$x^{(\ell)} = \gamma^{(\ell)} \hat{x}^{(\ell-1)} + \beta^{(\ell)}$$

FIG. 12

Batch Normalization – Inference with Convolutional Neural Networks $$\hat{x}^{(\ell-1)} = \frac{x^{(\ell-1)} - \mu_\mathcal{D}}{\sqrt{\sigma_\mathcal{D}^2 + \epsilon}}$$

$$x_i^{(\ell)} = \gamma^{(\ell)} \hat{x}_i^{(\ell-1)} + \beta^{(\ell)}$$

FIG. 13

Batch Normalization Backward Pass with
Convolutional Neural Networks $$\nabla_{\gamma^{(\ell)}} \mathcal{L} = \sum_{i=1}^{n} (\nabla_{x^{(\ell+1)}} \mathcal{L})_i \cdot \hat{x}_i^{(\ell)}$$

$$\nabla_{\beta^{(\ell)}} \mathcal{L} = \sum_{i=1}^{n} (\nabla_{x^{(\ell+1)}} \mathcal{L})_i$$

FIG. 14

Batch Normalization in Convolution Layers

```
conv_model.add(layers.Conv2D(32, 3, activation='relu'))
conv_model.add(layers.BatchNormalization())

dense_model.add(layers.Dense(32, activation='relu'))
dense_model.add(layers.BatchNormalization())
```

←—— After a Conv layer

←—— After a Dense layer

FIG. 15

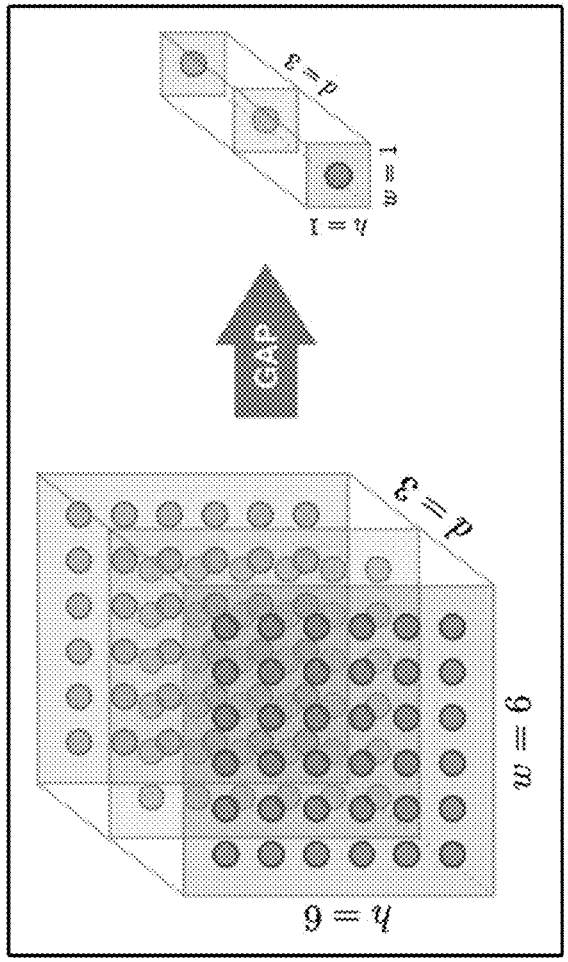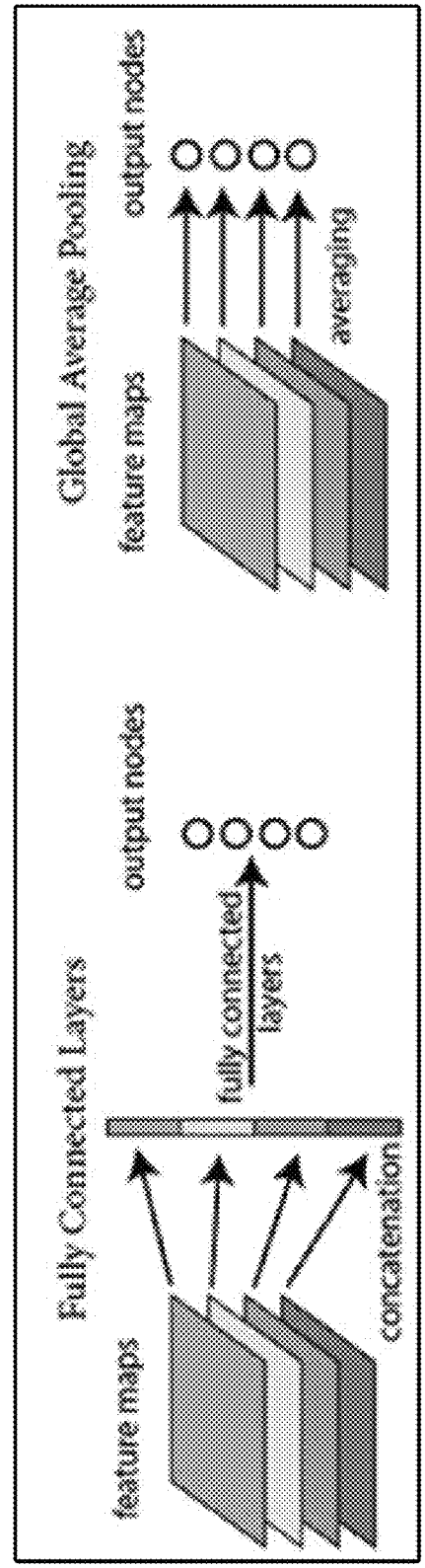
FIG. 17

MACHINE LEARNING-BASED SPEECH-TO-TEXT TRANSCRIPTION CLOUD INTERMEDIARY

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. In particular, the technology disclosed relates to using deep learning and convolutional neural networks (CNNs) for analyzing ordered data.

PRIORITY APPLICATIONS

This application claims priority to or the benefit of U.S. Provisional Patent Application No. 62/666,017, entitled "MACHINE LEARNING-BASED SPEECH-TO-TEXT TRANSCRIPTION CLOUD INTERMEDIARY," filed on May 2, 2018. The priority application is hereby incorporated by reference for all purposes.

This application claims priority to or the benefit of U.S. Provisional Patent Application No. 62/666,025, entitled "DEEP LEARNING-BASED SPEECH-TO-TEXT TRANSCRIPTION CLOUD INTERMEDIARY," filed on May 2, 2018. The priority application is hereby incorporated by reference for all purposes.

This application claims priority to or the benefit of U.S. Provisional Patent Application No. 62/666,050, entitled "EXPERT DEEP NEURAL NETWORKS FOR SPEECH-TO-TEXT TRANSCRIPTION," filed on May 2, 2018. The priority application is hereby incorporated by reference for all purposes.

INCORPORATIONS

The following materials are incorporated by reference as if fully set forth herein:

A. van den Oord, S. Dieleman, H. Zen, K. Simonyan, O. Vinyals, A. Graves, N. Kalchbrenner, A. Senior, and K. Kavukcuoglu, "WAVENET: A GENERATIVE MODEL FOR RAW AUDIO," arXiv:1609.03499, 2016;

S. Ö. Arik, M. Chrzanowski, A. Coates, G. Diamos, A. Gibiansky, Y. Kang, X. Li, J. Miller, A. Ng, J. Raiman, S. Sengupta and M. Shoeybi, "DEEP VOICE: REAL-TIME NEURAL TEXT-TO-SPEECH," arXiv:1702.07825, 2017;

J. Wu, "INTRODUCTION TO CONVOLUTIONAL NEURAL NETWORKS," Nanjing University, 2017;

I. J. Goodfellow, D. Warde-Farley, M. Mirza, A. Courville, and Y. Bengio, "CONVOLUTIONAL NETWORKS," Deep Learning, MIT Press, 2016;

F. Chaubard, R. Mundra, and R. Socher, "CS 224D: DEEP LEARNING FOR NLP, LECTURE NOTES: PART I," 2015;

F. Chaubard, R. Mundra, and R. Socher, "CS 224D: DEEP LEARNING FOR NLP, LECTURE NOTES: PART II," 2015;

F. Chaubard, R. Mundra, and R. Socher, "CS 224D: DEEP LEARNING FOR NLP, LECTURE NOTES: PART III," 2015;

F. Chaubard, R. Mundra, and R. Socher, "CS 224D: DEEP LEARNING FOR NLP, LECTURE NOTES: PART IV," 2015;

F. Chaubard, R. Mundra, and R. Socher, "CS 224D: DEEP LEARNING FOR NLP, LECTURE NOTES: PART V," 2015; and Y. Fan, M. Potok, and C. Shroba, "DEEP LEARNING FOR AUDIO," 2017.

TECHNOLOGY DISCLOSED

The technology disclosed relates to a machine learning based speech-to-text transcription intermediary which, from among multiple speech recognition engines, selects a speech recognition engine for accurately transcribing an audio channel based on sound and speech characteristics of the audio channel.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 12 shows the batch normalization forward pass.

FIG. 13 illustrates the batch normalization transform at test time.

FIG. 14 shows the batch normalization backward pass.

FIG. 15 depicts use of a batch normalization layer with convolutional or densely connected layer.

FIG. 17 illustrates how global average pooling (GAP) works.

DETAILED DESCRIPTION

Figure 1:
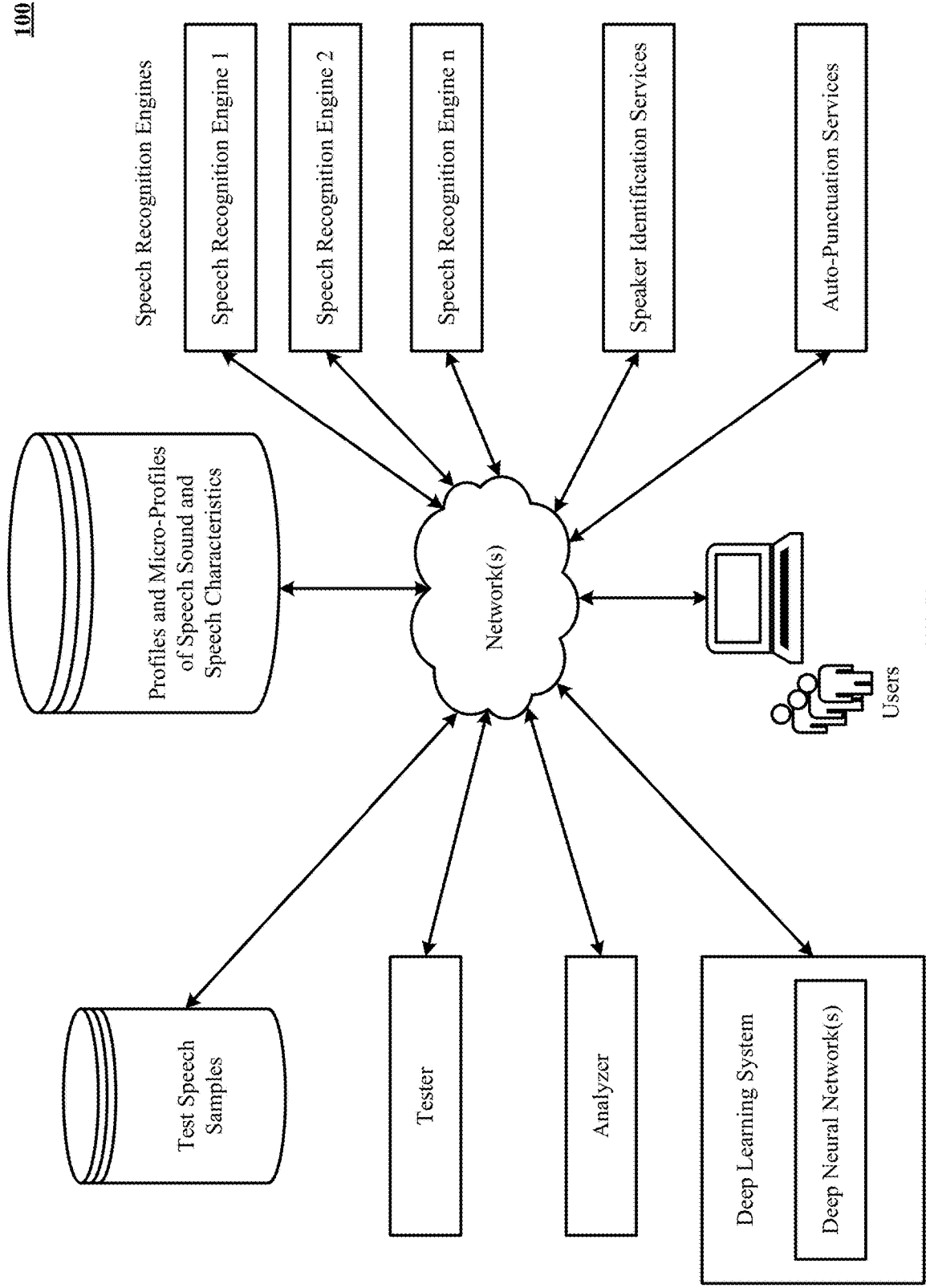
FIG. 1 illustrates various aspects of the machine learning based speech-to-text transcription intermediary.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

The film, audio, and video industries create some of the most evocative stories that reach deep into the human soul. But those productions are often complex and costly affairs that are inaccessible to aspiring creators, and even entire segments of creators, putting undue distance between the artist and the realization of their vision.

Artificial intelligence technologies, such as speech recognition, natural language processing, and computer vision, will fundamentally shape the production process in the coming decades and has the potential to be a democratizing force in the participation of those creative industries.

At first AI will seem cool but not good enough for production. But underneath the currents are forming to meaningfully chip at the barriers to entry, as advances in technologies, such as digital cameras and non-linear editing software, before it have.

AI, like the aforementioned technologies, will reduce production costs. But it will also increase the quality of storytelling.

The mundane, tedious, and frustrating aspects of production have both visible, such as time, and invisible, such as energy and opportunity, costs. By reducing them with AI software, creators will be liberated to focus on their craft.

An example is transcribing interviews which has long been a time-consuming, manual, yet important, part of the post-production process.

Advances in speech recognition technology and its ability to accurately transcribe audio in virtually any language, quickly, has made listening to and typing up an interview look as antiquated as waving your hands to flag a taxi. Now any independent creator can swiftly identify the meaningful parts of their interviews with transcripts produced by AI for a fraction of the time and expense of the traditional laborious method.

We are excited about this increasingly permission-less future where barriers are steadily reduced and new storytellers enter the fold to realize their vision, limited by just their imagination. The work we do resoundingly seeks to answer the question 'who has the right to tell stories?' We all do. For when anyone can tell stories, everyone's story, hopes, and aspirations get told.

And living in a world of greater inclusivity, dignity, and mutual respect is one worth building towards.

Machine Learning

During a testing stage, the transcription intermediary tests multiple speech recognition engines on dozens, hundreds, and/or thousands of test speech samples that have a variety of sound and speech characteristics. The testing identifies, for each of the speech recognition engines, which combinations of the sound and speech characteristics caused the corresponding speech recognition engines to produce accurate and/or improved transcription results and which combinations caused them to produce inferior and/or degraded transcription results.

In implementations, the accuracy and/or improvement of the transcription results and the inferiority and/or degradation of the transcription results are quantified using speech recognition metrics such as percentage of exact recognized sentences, word error rate (WER), character error rate (CER), and sentence error rate (SER), collectively referred to as transcription error rates.

In some implementations, the accuracy and/or improvement of the transcription results and the inferiority and/or degradation of the transcription results are determined based on comparison with performance baselines previously established for the respective speech recognition engines. In other implementations, they are determined based on thresholds set for acceptable transcription results.

In some implementations, the test speech samples are control files that do not modify parameters of the speech recognition engines and thus do not impact their transcription performance. In some implementations, the test speech samples are randomly selected from a pool of test speech samples.

Since the speech recognition engines are regularly trained and their performance with respect to the different sound and speech characteristics varies over time, the testing is performed periodically. Periodicity is quantified by a temporal parameter such as daily, weekly, or monthly.

Some examples of speech recognition engines tested by the transcription intermediary and used for transcribing audio files and/or their parts are Google Cloud Speech API, IBM Watson, Microsoft Speech Bing API, Amazon Transcribe API, Nuance, Speechmatics, AssemblyAI, VoiceBase, Deepgram, Dialogflow API, UWP Speech Recognition, iFLYTEK Speech Engine, Vocapia Speech to Text API, Gridspace Sift, KeenASR, Kaldi, and CMU Sphinx. In some implementation, a single speech recognition engine is composed of multiple speech recognition engines, each dedicated to a particular language (Arabic) or a dialect of a language (Modern Standard Arabic and Lebanese Arabic). Both meanings of speech recognition engine are considered herein, depending on the context.

Having described the testing stage, the discussion now turns to the sound and speech characteristics and how they are extracted.

Profiling

The following is a sample of sound and speech characteristics used by the technology disclosed in accordance with one implementation:

| Sound and Speech Characteristic | Extraction Means |
| --- | --- |
| Audio fidelity. For example, clean audio recorded with a directional microphone has a different accuracy level than the same speakers speaking the same words into an omni-directional microphone | Signal analysis by a tool such as FFmpeg, SoX, Aubio (https://aubio.org/), Essentia (http://essentia.upf.edu/documentation/), and Marsyas (http://marsyas.info/) |
| Noise such as background noise | Signal analysis by a tool such as FFmpeg, SoX, Aubio (https://aubio.org/), Essentia (http://essentia.upf.edu/documentation/), and Marsyas (http://marsyas.info/) |

-continued

| Sound and Speech Characteristic | Extraction Means |
| --- | --- |
| Whether speakers are speaking concurrently and over each other in the same audio channel | Signal analysis by a tool such as FFmpeg, SoX, Aubio (https://aubio.org/), Essentia (http://essentia.upf.edu/documentation/), and Marsyas (http://marsyas.info/); alternatively, preliminary processing by a speech recognition engine |
| Do the speakers have non-native accents | Preliminary processing by a speech recognition engine |
| Audio file's sample rate | Signal analysis by a tool such as FFmpeg, SoX, Aubio (https://aubio.org/), Essentia (http://essentia.upf.edu/documentation/), and Marsyas (http://marsyas.info/) |
| Language spoken by the speakers | Preliminary processing by a speech recognition engine |
| Dialect spoken. For example, dialects such as Modern Standard Arabic and Lebanese Arabic produce different transcription results by the same speech recognition engine or its components | Preliminary processing by a speech recognition engine |
| Audio channel separation vs mono recordings | Signal analysis by a tool such as FFmpeg, SoX, Aubio (https://aubio.org/), Essentia (http://essentia.upf.edu/documentation/), and Marsyas (http://marsyas.info/) |
| Duration | Analysis by a tool such as FFmpeg, SoX, Aubio (https://aubio.org/), Essentia (http://essentia.upf.edu/documentation/), and Marsyas (http://marsyas.info/) |
| Loudness | Signal analysis by a tool such as FFmpeg, SoX, Aubio (https://aubio.org/), Essentia (http://essentia.upf.edu/documentation/), and Marsyas (http://marsyas.info/) |
| Timbre—for example if people are "singing" their speech, this will have a lower accuracy than "normal" speech | Signal analysis by a tool such as FFmpeg, SoX, Aubio (https://aubio.org/), Essentia (http://essentia.upf.edu/documentation/), and Marsyas (http://marsyas.info/) |
| Pitch | Signal analysis by a tool such as FFmpeg, SoX, Aubio (https://aubio.org/), Essentia (http://essentia.upf.edu/documentation/), and Marsyas (http://marsyas.info/) |
| Audio distortion | Signal analysis by a tool such as FFmpeg, SoX, Aubio (https://aubio.org/), Essentia (http://essentia.upf.edu/documentation/), and Marsyas (http://marsyas.info/) |
| Echo/reverb | Signal analysis by a tool such as FFmpeg, SoX, Aubio (https://aubio.org/), Essentia (http://essentia.upf.edu/documentation/), and Marsyas (http://marsyas.info/) |
| Amount of bass/mid/treble (sound frequency) | Signal analysis by a tool such as FFmpeg, SoX, Aubio (https://aubio.org/), Essentia (http://essentia.upf.edu/documentation/), and Marsyas (http://marsyas.info/) |
| Length of file | Signal analysis by a tool such as FFmpeg, SoX, Aubio (https://aubio.org/), Essentia (http://essentia.upf.edu/documentation/), and Marsyas (http://marsyas.info/) |
| Subject matter | Preliminary processing by a speech recognition engine or natural language processing system that determines context or topic of a speech sample. |
| Speed of the spoken words | Preliminary processing by a speech recognition engine |
| Speed of switching between speakers | Preliminary processing by a speech recognition engine and speaker identification/separation engine |
| Large variances in volume of speech, especially in a short amount of time (related to loudness) | Analysis by a tool such as FFmpeg, SoX, Aubio (https://aubio.org/), Essentia (http://essentia.upf.edu/documentation/), and Marsyas (http://marsyas.info/) |
| Audio file format | Analysis by a tool such as FFmpeg, SoX, Aubio (https://aubio.org/), Essentia (http://essentia.upf.edu/documentation/), and Marsyas (http://marsyas.info/) |
| Audio codec | Signal analysis by a tool such as FFmpeg, SoX, Aubio (https://aubio.org/), Essentia (http://essentia.upf.edu/documentation/), and Marsyas (http://marsyas.info/) |

-continued

| Sound and Speech Characteristic | Extraction Means |
| --- | --- |
| Compressed audio, as opposed to uncompressed audio | Signal analysis by a tool such as FFmpeg, SoX, Aubio (https://aubio.org/), Essentia (http://essentia.upf.edu/documentation/), and Marsyas (http://marsyas.info/) |
| Lossless audio | Signal analysis by a tool such as FFmpeg, SoX, Aubio (https://aubio.org/), Essentia (http://essentia.upf.edu/documentation/), and Marsyas (http://marsyas.info/) |
| Traits of speaker's voice which are affected by factors such as gender, age, and health. | Preliminary processing by a speech recognition engine, speaker identification engine and/or NLP engine |
| Formality and informality/colloquialism of the speech. For example, are the speakers presenting formally, slowly, clearly at a conference or are they answering questions quickly on Jeopardy. | Preliminary processing by a speech recognition engine, speaker identification engine and/or NLP engine |
| Music identification such as where in the audio, if any, there is music which could have a negative impact on speech recognition accuracy | Signal analysis by a tool such as FFmpeg, SoX, Aubio (https://aubio.org/), Essentia (http://essentia.upf.edu/documentation/), and Marsyas (http://marsyas.info/) |
| Origin of the audio file | Previously stored mappings; preliminary processing by a speech recognition engine, speaker identification engine and/or NLP engine |

The above discussion with respect to testing speech recognition engines applies analogously to speaker separation/identification (diarization) engines and auto-punctuation engines.

The transcription intermediary receives an audio file from a transcription client, which could be a transcription website such as Simon Says (https://simonsays.ai/; https://larryjordan.com/articles/first-look-simon-says-automated-transcripts/) or a cloud application such as Dropbox. Typically, the audio file is a video recording with one or more audio channels encoded in the video recording.

The audio file is then filtered by file type and code, according to some implementations. In some implementations, a silence detector is used to identify and/or remove silence periods above certain temporal length or data size from the audio file.

Next, the length of the file and the number of audio channels in the file are determined.

In some implementations, the audio file is transcoded to an acceptable format to ensure compliance with certain speech recognition engines. In implementations, transcoding is performed based on the file formats, codecs, and length of the audio file since certain speech recognition engines can handle certain types of file formats, codecs, and length.

Following this, a profile is developed for the audio file that identifies various sound and speech characteristics of the audio file, as listed above. In some implementations, multiple micro-profiles are developed for the audio file such that different parts of the audio file get their own respective profile of sound and speech characteristics. In the context of this application, parts of an audio file can be an audio channel of the file, a speaker from among multiple speakers in the file, a particular language spoken in the audio file among other languages spoken in the audio file, a portion or segment of the audio file in terms of recording length.

Then, at least one speech recognition engine is selected from the speech recognition engines which, based on the testing and the developed profile of the audio file or the developed micro-profiles of the respective parts of the audio file, is likely to produce the most accurate transcription of the audio file or of the respective parts of the audio file.

Thus, this way either the entire audio file is sent to the selected speech recognition engine and/or different parts of the audio file are sent to corresponding speech recognition engines that are most suitable for the respective parts of the audio file based on the testing, the profiles and/or the micro-profiles. In other words, the speech recognition engine selected for a part of the audio file is specific to the micro-profile of that part and may or may not be selected for other parts of the audio file depending on their respective micro-profiles. In implementations, the profile and/or the micro-profile development is implemented by an analyzer.

In some implementations, two or more speech recognition engines are selected for the audio file or for the respective parts of the audio file in dependence upon the testing and the developed profile of the audio file or the developed micro-profiles of the respective parts of the audio file. The two or more speech recognition engines are selected as being the top candidates for transcribing the audio file or the respective parts of the audio file. In other words, the two or more speech recognition engines selected for a part of the audio file are specific to the micro-profile of that part and may or may not be selected for other parts of the audio file depending on their respective micro-profiles.

When two or more speech recognition engines are selected and used, they may be used in parallel or sequentially and the transcription results of the two or more speech recognition engines can be normalized, compared, and/or combined to select a final transcription on a word-by-word basis, sentence-by-sentence basis, paragraph-by-paragraph basis, or part-by-part basis. If just a single speech recognition engine is used, then its output is used as the final transcription.

The above listed steps described with respect to speech recognition engines apply analogously to speaker separation/identification (diarization) engines and auto-punctuation engines.

In implementations, the transcription results, along with the confidence accuracies are presented to the user across a web interface.

According to a planned retreat approach, if a word has low confidence accuracy then it can be sent to one or more different speech recognition engines for verification.

According to a cross-validation approach, the web interface can be configured to allow the user to give feedback on the final transcription. The feedback can be a numerical rating and/or edits to the final transcription. The feedback can then be subsequently used to evaluate the performance of speech recognition engines and reconfigure the mapping between the sound and speech characteristics and the speech recognition engines, as determined from the periodic testing.

In some implementations, the technology disclosed further includes pre-filtering the audio channel to enhance audio quality before submitting the audio channel.

Deep Learning

In a deep learning implementation, the technology disclosed includes a deep learning system. The deep learning system comprises a training stage of a deep neural network that trains the deep neural network to submit hundreds of training speech samples to multiple speech recognition engines and determine how transcription error rates of the speech recognition engines vary with sound and speech characteristics of the training speech samples.

The deep learning system further comprises an input stage of the trained deep neural network that feeds an audio channel to the trained deep neural network for processing.

The deep learning system further comprises an output stage of the trained deep neural network that qualifies the speech recognition engines as capable of transcribing the audio channel and/or its parts, taking into account at least a recording codec of the audio channel, available transcoding from the recording codec to a speech recognition engine supported codec, a length of the audio channel, and a language of the audio channel, applies an audio channel analyzer to the audio channel to characterize audio fidelity, background noise, concurrent speech by multiple speakers, timbre, pitch, and audio distortion of the audio channel, translates processing by the deep neural network into selection of a speech recognition engine that is qualified as capable of transcribing the audio channel and/or its parts or a transcoded version of the audio channel and/or its parts, taking into account the audio fidelity, background noise, concurrent speech by multiple speakers, timbre, pitch, and audio distortion of the audio channel and how transcription error rates of the speech recognition engines vary, based on the training on the hundreds of training speech samples, and submits the audio channel and/or its parts to the selected speech recognition engine.

In one implementation, the deep neural network can be a feed-forward neural network. The deep neural network can be a recurrent neural network, including a long short-term memory (LSTM) network and a gated recurrent unit (GRU). The deep neural network can be a convolutional neural network (CNN).

The deep neural network can be trained using backpropagation. The deep neural network can be trained using reinforcement learning.

Expert Deep Neural Networks

The technology disclosed relates to a machine learning based speech-to-text transcription intermediary which, from among multiple expert deep neural networks, selects a expert deep neural network for accurately transcribing an audio channel based on sound and speech characteristics of the audio channel.

During a training stage, the transcription intermediary tests multiple expert deep neural networks on dozens, hundreds, and/or thousands of test speech samples that have a variety of sound and speech characteristics. The training identifies, for each of the expert deep neural networks, which combinations of the sound and speech characteristics caused the corresponding expert deep neural networks to produce accurate and/or improved transcription results and which combinations caused them to produce inferior and/or degraded transcription results.

In implementations, the accuracy and/or improvement of the transcription results and the inferiority and/or degradation of the transcription results are quantified using speech recognition metrics such as percentage of exact recognized sentences, word error rate (WER), character error rate (CER), and sentence error rate (SER), collectively referred to as transcription error rates.

In some implementations, the accuracy and/or improvement of the transcription results and the inferiority and/or degradation of the transcription results are determined based on comparison with performance baselines previously established for the respective expert deep neural networks. In other implementations, they are determined based on thresholds set for acceptable transcription results.

In some implementations, the test speech samples are control files that do not modify parameters of the expert deep neural networks and thus do not impact their transcription performance. In some implementations, the test speech samples are randomly selected from a pool of test speech samples.

Since the expert deep neural networks are regularly trained and their performance with respect to the different sound and speech characteristics varies over time, the training is performed periodically. Periodicity is quantified by a temporal parameter such as daily, weekly, or monthly.

Some examples of expert deep neural networks tested by the transcription intermediary and used for transcribing audio files and/or their parts are Google Cloud Speech API, IBM Watson, Microsoft Speech Bing API, Amazon Transcribe API, Nuance, Speechmatics, AssemblyAI, VoiceBase, Deepgram, Dialogflow API, UWP Speech Recognition, iFLYTEK Speech Engine, Vocapia Speech to Text API, Gridspace Sift, KeenASR, Kaldi, and CMU Sphinx. In some implementation, a single expert deep neural network is composed of multiple expert deep neural networks, each dedicated to a particular language (Arabic) or a dialect of a language (Modern Standard Arabic and Lebanese Arabic). Both meanings of expert deep neural network are considered herein, depending on the context.

The transcription intermediary receives an audio file from a transcription client, which could be a transcription website such as Simon Says (https://simonsays.ai/; https://larryjordan.com/articles/first-look-simon-says-automated-transcripts/) or a cloud application such as Dropbox. Typically, the audio file is a video recording with one or more audio channels encoded in the video recording.

The audio file is then filtered by file type and code, according to some implementations. In some implementations, a silence detector is used to identify and/or remove silence periods above certain temporal length or data size from the audio file.

Next, the length of the file and the number of audio channels in the file are determined.

In some implementations, the audio file is transcoded to an acceptable format to ensure compliance with certain expert deep neural networks. In implementations, transcoding is performed based on the file formats, codecs, and length of the audio file since certain expert deep neural networks can handle certain types of file formats, codecs, and length.

Following this, a profile is developed for the audio file that identifies various sound and speech characteristics of the audio file, as listed above. In some implementations, multiple micro-profiles are developed for the audio file such that different parts of the audio file get their own respective profile of sound and speech characteristics. In the context of this application, parts of an audio file can be an audio channel of the file, a speaker from among multiple speakers in the file, a particular language spoken in the audio file among other languages spoken in the audio file, a portion or segment of the audio file in terms of recording length.

Then, at least one expert deep neural network is selected from the expert deep neural networks which, based on the training and the developed profile of the audio file or the developed micro-profiles of the respective parts of the audio file, is likely to produce the most accurate transcription of the audio file or of the respective parts of the audio file. Thus, this way either the entire audio file is sent to the selected expert deep neural network and/or different parts of the audio file are sent to corresponding expert deep neural networks that are most suitable for the respective parts of the audio file based on the training, the profiles and/or the micro-profiles. In other words, the expert deep neural network selected for a part of the audio file is specific to the micro-profile of that part and may or may not be selected for other parts of the audio file depending on their respective micro-profiles. In implementations, the profile and/or the micro-profile development is implemented by an analyzer.

In some implementations, two or more expert deep neural networks are selected for the audio file or for the respective parts of the audio file in dependence upon the training and the developed profile of the audio file or the developed micro-profiles of the respective parts of the audio file. The two or more expert deep neural networks are selected as being the top candidates for transcribing the audio file or the respective parts of the audio file. In other words, the two or more expert deep neural networks selected for a part of the audio file are specific to the micro-profile of that part and may or may not be selected for other parts of the audio file depending on their respective micro-profiles.

When two or more expert deep neural networks are selected and used, they may be used in parallel or sequentially and the transcription results of the two or more expert deep neural networks can be normalized, compared, and/or combined to select a final transcription on a word-by-word basis, sentence-by-sentence basis, paragraph-by-paragraph basis, or part-by-part basis. If just a single expert deep neural network is used, then its output is used as the final transcription.

The above listed steps described with respect to expert deep neural networks apply analogously to speaker separation/identification (diarization) engines and auto-punctuation engines.

In implementations, the transcription results, along with the confidence accuracies are presented to the user across a web interface.

According to a planned retreat approach, if a word has low confidence accuracy then it can be sent to one or more different expert deep neural networks for verification.

According to a cross-validation approach, the web interface can be configured to allow the user to give feedback on the final transcription. The feedback can be a numerical rating and/or edits to the final transcription. The feedback can then be subsequently used to evaluate the performance expert deep neural networks and reconfigure the mapping between the sound and speech characteristics and the expert deep neural networks, as determined from the periodic training.

In some implementations, the technology disclosed further includes pre-filtering the audio channel to enhance audio quality before submitting the audio channel.

In implementations, the training, the testing, and the transcription during inference can be performed using an IaaS, PaaS, SaaS, or server-less FaaS platform such as Lamda and AWS.

Clauses—Machine Learning-Based Speech-to-Text Transcription Cloud Intermediary

1. A computer-implemented method of cloud-based speech recognition from audio channels without prior training to adapt to speaker(s) in the audio channels, the method including:

submitting hundreds of speech samples to multiple speech recognition engines, and analyzing how transcription error rates of the speech recognition engines vary with sound and speech characteristics of the speech samples;

receiving an audio channel and qualifying the speech recognition engines as capable of transcribing the audio channel and/or its parts, taking into account at least a recording codec of the audio channel, available transcoding from the recording codec to a speech recognition engine supported codec, a length of the audio channel, and a language of the audio channel;

applying an audio channel analyzer to the audio channel to characterize audio fidelity, background noise, concurrent speech by multiple speakers, timbre, pitch, and audio distortion of the audio channel;

selecting a speech recognition engine that is qualified as capable of transcribing the audio channel and/or its parts or a transcoded version of the audio channel and/or its parts, taking into account the audio fidelity, background noise, concurrent speech by multiple speakers, timbre, pitch, and audio distortion of the audio channel and how transcription error rates of the speech recognition engines vary, based on the analyzing of the hundreds of speech samples; and submitting the audio channel and/or its parts to the selected speech recognition engine.

2. The computer-implemented method of clause 1, further including:

using the multiple speech recognition engines on the audio channel, including using the speech recognition engines sequentially when a first speech recognition engine reports a low confidence score on some or all of its transcription.

3. The computer-implemented method of clause 1, further including:

using the multiple speech recognition engines on all or separate parts of the audio channel, including using the speech recognition engines when voting on transcription results is used, when different speakers on different tracks of the audio channel, and when different speakers take turns during segments of the audio channel.

4. The computer-implemented method of clause 1, further including applying the method to separation/identification (diarization) engines.

5. The computer-implemented method of clause 1, further including applying the method to auto-punctuation engines.

6. The computer-implemented method of clause 1, further including applying a silence analyzer to the speech samples and the audio channel prior to submission to parse out silent parts of speech.

7. The computer-implemented method of clause 1, further including performing the testing periodically, including daily, weekly, or monthly.

8. A computer-implemented method of cloud-based speech recognition from audio channels without prior training to adapt to speaker(s) in the audio channels, the method including:
submitting thousands of speech samples to multiple speech recognition engines, and analyzing how transcription error rates of the speech recognition engines vary with sound and speech characteristics of the speech samples;
receiving an audio channel and qualifying the speech recognition engines as capable of transcribing the audio channel and/or its parts, taking into account at least a recording codec of the audio channel, available transcoding from the recording codec to a speech recognition engine supported codec, a length of the audio channel, and a language of the audio channel;
applying an audio channel analyzer to the audio channel to characterize audio fidelity, background noise, concurrent speech by multiple speakers, timbre, pitch, and audio distortion of the audio channel;
selecting a speech recognition engine that is qualified as capable of transcribing the audio channel and/or its parts or a transcoded version of the audio channel and/or its parts, taking into account the audio fidelity, background noise, concurrent speech by multiple speakers, timbre, pitch, and audio distortion of the audio channel and how transcription error rates of the speech recognition engines vary, based on the analyzing of the hundreds of speech samples; and
submitting the audio channel and/or its parts to the selected speech recognition engine.

9. A computer-implemented method of cloud-based speech recognition from audio channels without prior training to adapt to speaker(s) in the audio channels, the method including:
submitting dozens of speech samples to multiple speech recognition engines, and analyzing how transcription error rates of the speech recognition engines vary with sound and speech characteristics of the speech samples;
receiving an audio channel and qualifying the speech recognition engines as capable of transcribing the audio channel and/or its parts, taking into account at least a recording codec of the audio channel, available transcoding from the recording codec to a speech recognition engine supported codec, a length of the audio channel, and a language of the audio channel;
applying an audio channel analyzer to the audio channel to characterize audio fidelity, background noise, concurrent speech by multiple speakers, timbre, pitch, and audio distortion of the audio channel;
selecting a speech recognition engine that is qualified as capable of transcribing the audio channel and/or its parts or a transcoded version of the audio channel and/or its parts, taking into account the audio fidelity, background noise, concurrent speech by multiple speakers, timbre, pitch, and audio distortion of the audio channel and how transcription error rates of the speech recognition engines vary, based on the analyzing of the hundreds of speech samples; and
submitting the audio channel and/or its parts to the selected speech recognition engine.

10. A system including one or more processors coupled to memory, the memory loaded with computer instructions to securely authenticate a recording file from initial collection through post-production and distribution, the instructions, when executed on the processors, implement actions of method 1.

11. A system including one or more processors coupled to memory, the memory loaded with computer instructions to securely authenticate a recording file from initial collection through post-production and distribution, the instructions, when executed on the processors, implement actions of method 8.

12. A system including one or more processors coupled to memory, the memory loaded with computer instructions to securely authenticate a recording file from initial collection through post-production and distribution, the instructions, when executed on the processors, implement actions of method 9.

13. A non-transitory computer readable storage medium impressed with computer program instructions to securely authenticate a recording file from initial collection through post-production and distribution, the instructions, when executed on a processor, implement the method of clause 1.

14. A non-transitory computer readable storage medium impressed with computer program instructions to securely authenticate a recording file from initial collection through post-production and distribution, the instructions, when executed on a processor, implement the method of clause 8.

15. A non-transitory computer readable storage medium impressed with computer program instructions to securely authenticate a recording file from initial collection through post-production and distribution, the instructions, when executed on a processor, implement the method of clause 9.

Clauses—Deep Learning-Based Speech-to-Text Transcription Cloud Intermediary

1. A deep learning system, comprising:
a training stage of a deep neural network that trains the deep neural network to submit hundreds of training speech samples to multiple speech recognition engines and determine how transcription error rates of the speech recognition engines vary with sound and speech characteristics of the training speech samples;
an input stage of the trained deep neural network that feeds an audio channel to the trained deep neural network for processing; and
an output stage of the trained deep neural network that
    qualifies the speech recognition engines as capable of transcribing the audio channel and/or its parts, taking into account at least a recording codec of the audio channel, available transcoding from the recording codec to a speech recognition engine supported codec, a length of the audio channel, and a language of the audio channel;
    applies an audio channel analyzer to the audio channel to characterize audio fidelity, background noise, concurrent speech by multiple speakers, timbre, pitch, and audio distortion of the audio channel;
    translates processing by the deep neural network into selection of a speech recognition engine that is qualified as capable of transcribing the audio channel and/or its parts or a transcoded version of the audio channel and/or its parts, taking into account the audio fidelity, background noise, concurrent speech by multiple speakers, timbre, pitch, and audio distortion of the audio channel and how transcription error rates of the speech recognition engines vary, based on the training on the hundreds of training speech samples; and
    submits the audio channel and/or its parts to the selected speech recognition engine.

2. The deep learning system of clause 1, wherein the deep neural network is a feed-forward neural network.

3. The deep learning system of clause 1, wherein the deep neural network is a recurrent neural network, including a long short-term memory (LSTM) network and a gated recurrent unit (GRU).

4. The deep learning system of clause 1, wherein the deep neural network is a convolutional neural network (CNN).

5. The deep learning system of clause 1, wherein the deep neural network is trained using backpropagation.

6. The deep learning system of clause 1, wherein the deep neural network is trained using reinforcement learning.

7. A non-transitory computer readable storage medium impressed with computer program instructions to securely authenticate a recording file from initial collection through post-production and distribution, the instructions, when executed on a processor, implement the system of clause 1.

Clauses—Expert Deep Neural Networks for Speech-to-Text Transcription

1. A neural network-based method of cloud-based speech recognition from audio channels without prior training to adapt to speaker(s) in the audio channels, the method including:

submitting hundreds of speech samples to multiple expert deep neural networks, and analyzing how transcription error rates of the expert deep neural networks vary with sound and speech characteristics of the speech samples;

wherein each of the expert deep neural networks is trained on a training set that is specific to a corresponding vocabulary and vernacular configured by a predefined criteria and, based on the training, made an expert is processing data inference data belonging to the corresponding vocabulary and vernacular;

receiving an audio channel and qualifying the expert deep neural networks as capable of transcribing the audio channel and/or its parts, taking into account at least an origin of the audio channel, a recording codec of the audio channel, available transcoding from the recording codec to a expert deep neural network supported codec, a length of the audio channel, and a language of the audio channel;

applying an audio channel analyzer to characterize audio fidelity, background noise, concurrent speech by multiple speakers, timbre, pitch, and audio distortion of the audio channel;

selecting an expert deep neural network that is qualified as capable of transcribing the audio channel and/or its parts or a transcoded version of the audio channel and/or its parts, taking into account the audio fidelity, background noise, concurrent speech by multiple speakers, timbre, pitch, and audio distortion of the audio channel and how transcription error rates of the expert deep neural networks vary, based on the analyzing of the hundreds of speech samples; and submitting the audio channel and/or its parts to the selected expert deep neural network.

2. The neural network-based method of clause 1, wherein the origin of the audio channel identifies a user and metadata about the user.

3. The neural network-based method of clause 2, wherein metadata about the user includes an industry of which the user is part of and an organization of which the user is part of.

4. The neural network-based method of clause 1, wherein the expert deep neural networks are trained on industry-specific training data, including industry-specific vocabulary, vernacular, and language.

5. The neural network-based method of clause 1, wherein the expert deep neural network is a feed-forward neural network.

6. The neural network-based method of clause 1, wherein the expert deep neural network is a recurrent neural network, including a long short-term memory (LSTM) network and a gated recurrent unit (GRU).

7. The neural network-based method of clause 1, wherein the expert deep neural network is a convolutional neural network (CNN).

8. The neural network-based method of clause 1, wherein the expert deep neural network is trained using backpropagation.

9. The neural network-based method of clause 1, wherein the expert deep neural network is trained using reinforcement learning.

10. The neural network-based method of clause 1, wherein the expert deep neural network is Google's WaveNet.

11. The neural network-based method of clause 1, wherein the expert deep neural network is Baidu's Deep Voice.

12. A system including one or more processors coupled to memory, the memory loaded with computer instructions to securely authenticate a recording file from initial collection through post-production and distribution, the instructions, when executed on the processors, implement actions of method 1.

13. A non-transitory computer readable storage medium impressed with computer program instructions to securely authenticate a recording file from initial collection through post-production and distribution, the instructions, when executed on a processor, implement the method of clause 1.

Computer System

Figure 2:
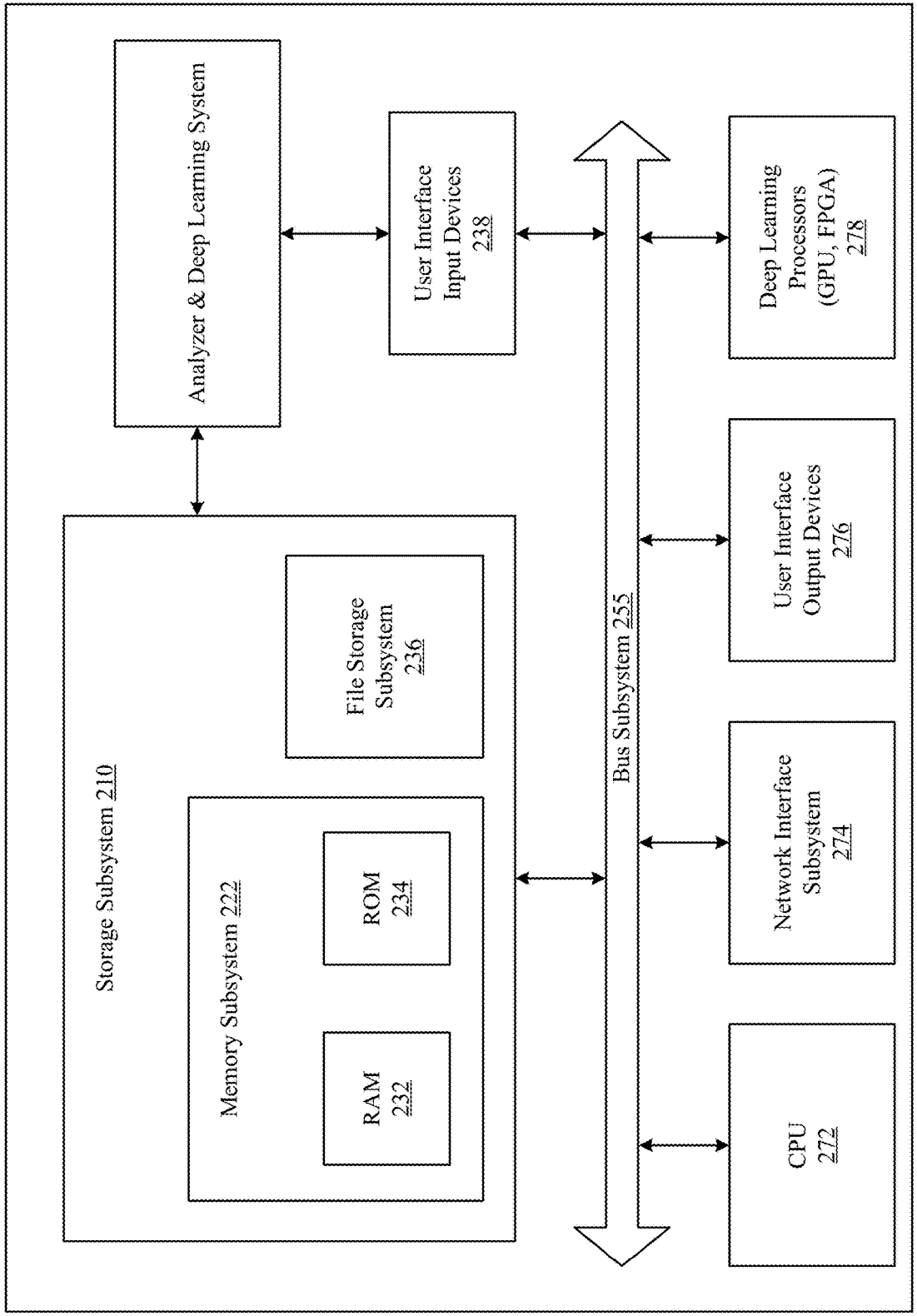
FIG. 2 illustrates one implementation of a computer system that can be used to implement the technology disclosed.

FIG. 2 illustrates one implementation of a computer system 200 that can be used to implement the technology disclosed. Computer system 200 includes at least one central processing unit (CPU) 272 that communicates with a number of peripheral devices via bus subsystem 255. These peripheral devices can include a storage subsystem 210 including, for example, memory devices and a file storage subsystem 236, user interface input devices 238, user interface output devices 276, and a network interface subsystem 274. The input and output devices allow user interaction with computer system 200. Network interface subsystem 274 provides an interface to outside networks, including an interface to corresponding interface devices in other computer systems. The attentional neural machine translation system can be communicably linked to the storage subsystem 210 and the user interface input devices 238.

User interface input devices 238 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 200.

User interface output devices 276 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 200 to the user or to another machine or computer system.

Storage subsystem 210 stores programming and data constructs that provide the functionality of some or all of the modules and methods described herein. These software modules are generally executed by deep learning processors 278.

Deep learning processors 278 can be graphics processing units (GPUs) or field-programmable gate arrays (FPGAs). Deep learning processors 278 can be hosted by a deep learning cloud platform such as Google Cloud Platform™, Xilinx™, and Cirrascale™. Examples of deep learning processors 278 include Google's Tensor Processing Unit (TPU)™, rackmount solutions like GX4 Rackmount Series™, GX2 Rackmount Series™, NVIDIA DGX-1™ Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™ NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem 222 used in the storage subsystem 210 can include a number of memories including a main random access memory (RAM) 232 for storage of instructions and data during program execution and a read only memory (ROM) 234 in which fixed instructions are stored. A file storage subsystem 236 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 236 in the storage subsystem 210, or in other machines accessible by the processor.

Bus subsystem 255 provides a mechanism for letting the various components and subsystems of computer system 200 communicate with each other as intended. Although bus subsystem 255 is shown schematically as a single bus, alternative implementations of the bus subsystem can use multiple busses.

Computer system 200 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 200 depicted in FIG. 2 is intended only as a specific example for purposes of illustrating the preferred embodiments of the present invention. Many other configurations of computer system 200 are possible having more or less components than the computer system depicted in FIG. 2.

We describe a system and various implementations of machine learning and deep learning-based speech-to-text transcription. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

Other implementations may include a non-transitory computer readable storage medium storing instructions executable by a processor to perform actions of the system described above. Each of the features discussed in the particular implementation section for other implementations apply equally to this implementation. As indicated above, all the other features are not repeated here and should be considered repeated by reference.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Deep Neural Networks
Convolutional Neural Networks

A convolutional neural network is a special type of neural network. The fundamental difference between a densely connected layer and a convolution layer is this: Dense layers learn global patterns in their input feature space, whereas convolution layers learn local patters: in the case of images, patterns found in small 2D windows of the inputs. This key characteristic gives convolutional neural networks two interesting properties: (1) the patterns they learn are translation invariant and (2) they can learn spatial hierarchies of patterns.

Regarding the first, after learning a certain pattern in the lower-right corner of a picture, a convolution layer can recognize it anywhere: for example, in the upper-left corner. A densely connected network would have to learn the pattern anew if it appeared at a new location. This makes convolutional neural networks data efficient because they need fewer training samples to learn representations they have generalization power.

Regarding the second, a first convolution layer can learn small local patterns such as edges, a second convolution layer will learn larger patterns made of the features of the first layers, and so on. This allows convolutional neural networks to efficiently learn increasingly complex and abstract visual concepts.

A convolutional neural network learns highly non-linear mappings by interconnecting layers of artificial neurons arranged in many different layers with activation functions that make the layers dependent. It includes one or more convolutional layers, interspersed with one or more sub-sampling layers and non-linear layers, which are typically followed by one or more fully connected layers. Each element of the convolutional neural network receives inputs from a set of features in the previous layer. The convolutional neural network learns concurrently because the neurons in the same feature map have identical weights. These local shared weights reduce the complexity of the network such that when multi-dimensional input data enters the network, the convolutional neural network avoids the complexity of data reconstruction in feature extraction and regression or classification process.

Convolutions operate over 3D tensors, called feature maps, with two spatial axes (height and width) as well as a depth axis (also called the channels axis). For an RGB image, the dimension of the depth axis is 3, because the image has three color channels; red, green, and blue. For a black-and-white picture, the depth is 1 (levels of gray). The convolution operation extracts patches from its input feature map and applies the same transformation to all of these patches, producing an output feature map. This output feature map is still a 3D tensor: it has a width and a height. Its depth can be arbitrary, because the output depth is a parameter of the layer, and the different channels in that depth axis no longer stand for specific colors as in RGB input; rather, they stand for filters. Filters encode specific aspects of the input data: at a height level, a single filter could encode the concept "presence of a face in the input," for instance.

For example, the first convolution layer takes a feature map of size (28, 28, 1) and outputs a feature map of size (26, 26, 32): it computes 32 filters over its input. Each of these 32 output channels contains a 26×26 grid of values, which is a response map of the filter over the input, indicating the response of that filter pattern at different locations in the input. That is what the term feature map means: every dimension in the depth axis is a feature (or filter), and the 2D tensor output [:, :, n] is the 2D spatial map of the response of this filter over the input.

Convolutions are defined by two key parameters: (1) size of the patches extracted from the inputs—these are typically 1×1, 3×3 or 5×5 and (2) depth of the output feature map— the number of filters computed by the convolution. Often these start with a depth of 32, continue to a depth of 64, and terminate with a depth of 128 or 256.

Figure 3:
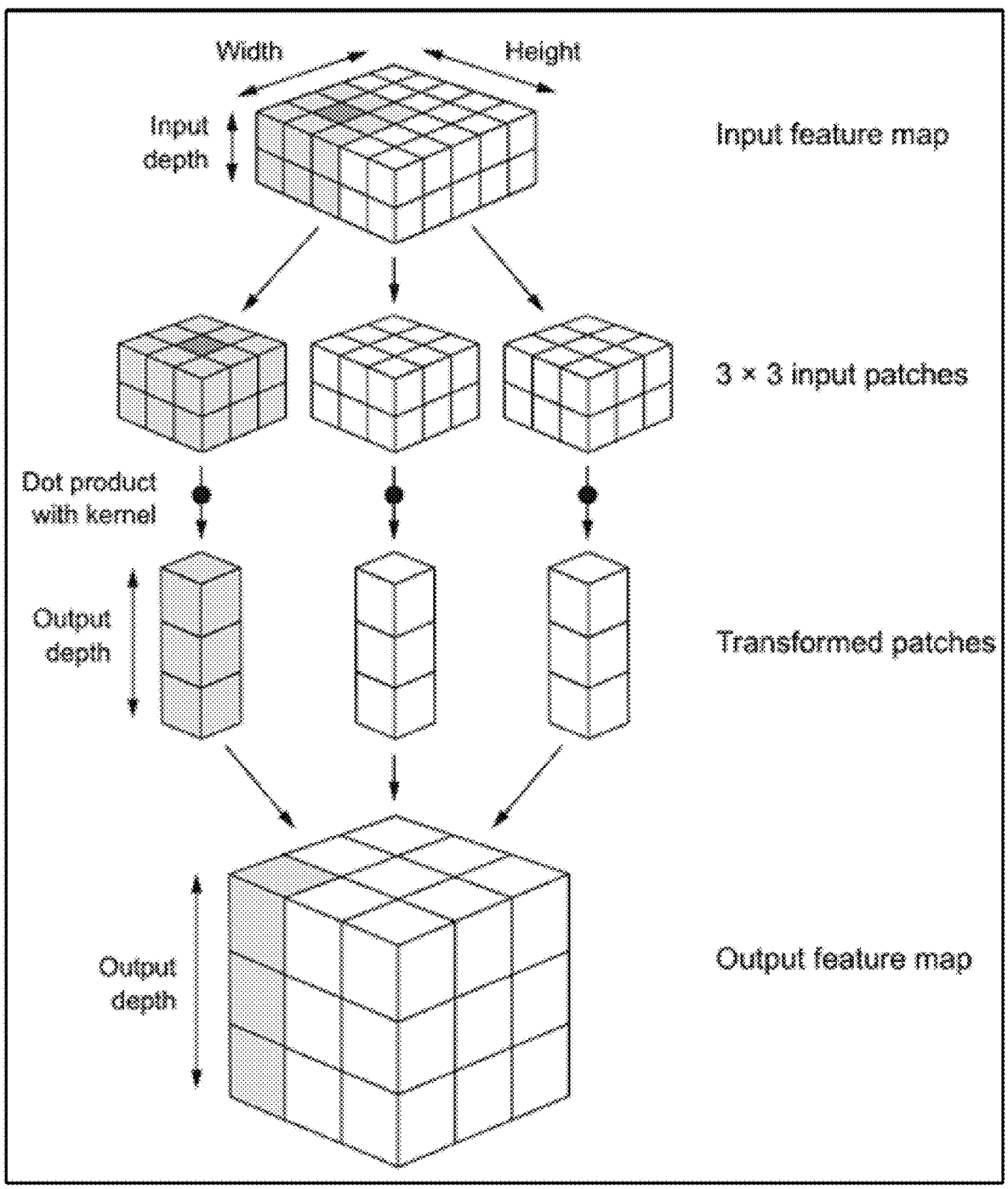
FIG. 3 depicts one implementation of workings of a convolutional neural network.

A convolution works by sliding these windows of size 3×3 or 5×5 over the 3D input feature map, stopping at every location, and extracting the 3D patch of surrounding features (shape (window_height, window_width, input_depth)). Each such 3D patch is ten transformed (via a tensor product with the same learned weight matrix, called the convolution kernel) into a 1D vector of shape (output_depth). All of these vectors are then spatially reassembled into a 3D output map of shape (height, width, output_depth). Every spatial location in the output feature map corresponds to the same location in the input feature map (for example, the lower-right corner of the output contains information about the lower-right corner of the input). For instance, with 3×3 windows, the vector output [i, j, :] comes from the 3D patch input [i−1: i+1, j−1:J+1, :]. The full process is detailed in FIG. 3.

The convolutional neural network comprises convolution layers which perform the convolution operation between the input values and convolution filters (matrix of weights) that are learned over many gradient update iterations during the training. Let (m, n) be the filter size and W be the matrix of weights, then a convolution layer performs a convolution of the W with the input X by calculating the dot product W·x+b, where x is an instance of X and b is the bias. The step size by which the convolution filters slide across the input is called the stride, and the filter area (m×n) is called the receptive field. A same convolution filter is applied across different positions of the input, which reduces the number of weights learned. It also allows location invariant learning, i.e., if an important pattern exists in the input, the convolution filters learn it no matter where it is in the sequence.

Training a Convolutional Neural Network

Figure 4:
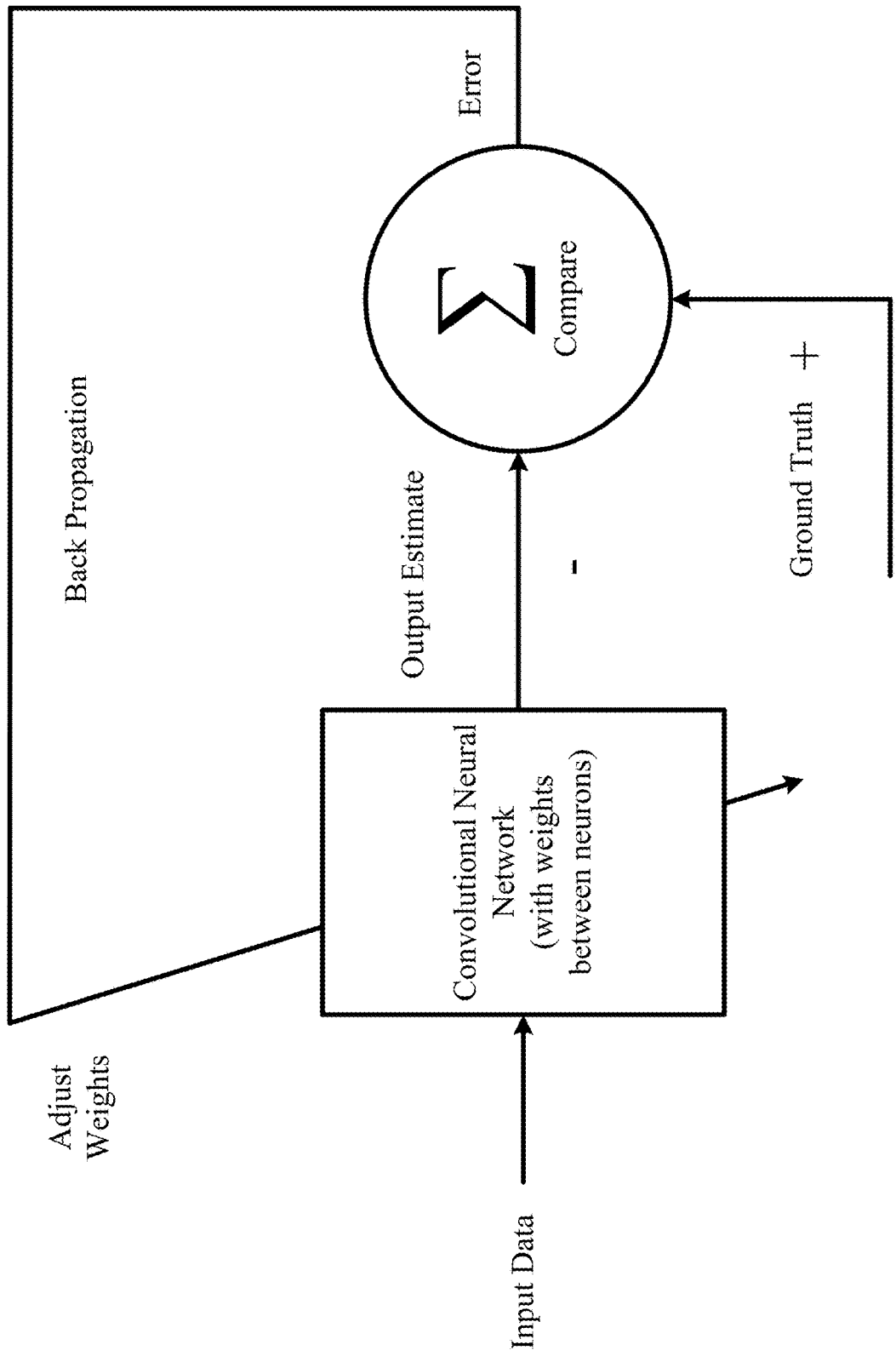
FIG. 4 depicts a block diagram of training a convolutional neural network in accordance with one implementation of the technology disclosed.

FIG. 4 depicts a block diagram of training a convolutional neural network in accordance with one implementation of the technology disclosed. The convolutional neural network is adjusted or trained so that the input data leads to a specific output estimate. The convolutional neural network is adjusted using back propagation based on a comparison of the output estimate and the ground truth until the output estimate progressively matches or approaches the ground truth.

The convolutional neural network is trained by adjusting the weights between the neurons based on the difference between the ground truth and the actual output. This is mathematically described as:

$$\Delta w_i = x_i \delta$$

where $\delta$ = (ground truth) − (actual output)

In one implementation, the training rule is defined as:

$$w_{nm} \leftarrow w_{nm} + \alpha(t_m - \varphi_m)a_n$$

In the equation above: the arrow indicates an update of the value; $t_m$ is the target value of neuron m; $\varphi_m$ is the computed current output of neuron m; $a_n$ is input n; and $\alpha$ is the learning rate.

The intermediary step in the training includes generating a feature vector from the input data using the convolution layers. The gradient with respect to the weights in each layer, starting at the output, is calculated. This is referred to as the backward pass, or going backwards. The weights in the network are updated using a combination of the negative gradient and previous weights.

In one implementation, the convolutional neural network uses a stochastic gradient update algorithm (such as ADAM) that performs backward propagation of errors by means of gradient descent. One example of a sigmoid function based back propagation algorithm is described below:

$$\varphi = f(h) = \frac{1}{1 + e^{-h}}$$

In the sigmoid function above, h is the weighted sum computed by a neuron. The sigmoid function has the following derivative:

$$\frac{\partial \varphi}{\partial h} = \varphi(1 - \varphi)$$

The algorithm includes computing the activation of all neurons in the network, yielding an output for the forward pass. The activation of neuron m in the hidden layers is described as:

$$\varphi_m = \frac{1}{1 + e^{-h_m}}$$

$$h_m = \sum_{n=1}^{M} a_n w_{nm}$$

This is done for all the hidden layers to get the activation described as:

$$\varphi_k = \frac{1}{1 + e^{h_k}}$$

$$h_k = \sum_{m=1}^{M} \varphi_m v_{mk}$$

Then, the error and the correct weights are calculated per layer. The error at the output is computed as:

$$\delta_{ok} = (t_k - \varphi_k)\varphi_k(1 - \varphi_k)$$

The error in the hidden layers is calculated as:

$$\delta_{hm} = \varphi_m(1-\varphi_m)\sum_{k=1}^{K} v_{mk}\delta_{ok}$$

The weights of the output layer are updated as:

$v_{mk} \leftarrow v_{mk} + \alpha\delta_{ok}\varphi_m$

The weights of the hidden layers are updated using the learning rate a as:

$v_{nm} \leftarrow w_{nm} + \alpha\delta_{hm}a_n$

In one implementation, the convolutional neural network uses a gradient descent optimization to compute the error across all the layers. In such an optimization, for an input feature vector x and the predicted output ŷ, the loss function is defined as l for the cost of predicting ŷ when the target is y, i.e. l (ŷ, y). The predicted output ŷ is transformed from the input feature vector x using function $f$. Function $f$ is parameterized by the weights of convolutional neural network, i.e. ŷ=$f_w$(x). The loss function is described as l (ŷ, y)=l ($f_w$(x), y), or Q (z, w)=l ($f_w$ (x), y) where z is an input and output data pair (x, y). The gradient descent optimization is performed by updating the weights according to:

$$v_{t+1} = \mu v_t - \alpha\frac{1}{n}\sum_{i=1}^{N}\nabla w_t Q(z_t, w_t)$$

$$w_{t+1} = w_t + v_{t+1}$$

In the equations above, α is the learning rate. Also, the loss is computed as the average over a set of n data pairs. The computation is terminated when the learning rate α is small enough upon linear convergence. In other implementations, the gradient is calculated using only selected data pairs fed to a Nesterov's accelerated gradient and an adaptive gradient to inject computation efficiency.

In one implementation, the convolutional neural network uses a stochastic gradient descent (SGD) to calculate the cost function. A SGD approximates the gradient with respect to the weights in the loss function by computing it from only one, randomized, data pair, $z_t$, described as:

$v_{t+1} = \mu v - \alpha\nabla wQ(z_t, w_t)$ $w_{t+1} = w_t + v_{t+1}$

In the equations above: α is the learning rate; μ is the momentum; and t is the current weight state before updating. The convergence speed of SGD is approximately O(1/t) when the learning rate α are reduced both fast and slow enough. In other implementations, the convolutional neural network uses different loss functions such as Euclidean loss and softmax loss. In a further implementation, an Adam stochastic optimizer is used by the convolutional neural network.

Convolution Layers

The convolution layers of the convolutional neural network serve as feature extractors. Convolution layers act as adaptive feature extractors capable of learning and decomposing the input data into hierarchical features. In one implementation, the convolution layers take two images as input and produce a third image as output. In such an implementation, convolution operates on two images in two-dimension (2D), with one image being the input image and the other image, called the "kernel", applied as a filter on the input image, producing an output image. Thus, for an input vector $f$ of length n and a kernel g of length m, the convolution $f*g$ of $f$ and g is defined as:

$$(f*g)(i) = \sum_{j=1}^{m} g(j)\cdot f(i-j+m/2)$$

The convolution operation includes sliding the kernel over the input image. For each position of the kernel, the overlapping values of the kernel and the input image are multiplied and the results are added. The sum of products is the value of the output image at the point in the input image where the kernel is centered. The resulting different outputs from many kernels are called feature maps.

Once the convolutional layers are trained, they are applied to perform recognition tasks on new inference data. Since the convolutional layers learn from the training data, they avoid explicit feature extraction and implicitly learn from the training data. Convolution layers use convolution filter kernel weights, which are determined and updated as part of the training process. The convolution layers extract different features of the input, which are combined at higher layers. The convolutional neural network uses a various number of convolution layers, each with different convolving parameters such as kernel size, strides, padding, number of feature maps and weights.

Non-Linear Layers

Figure 5:
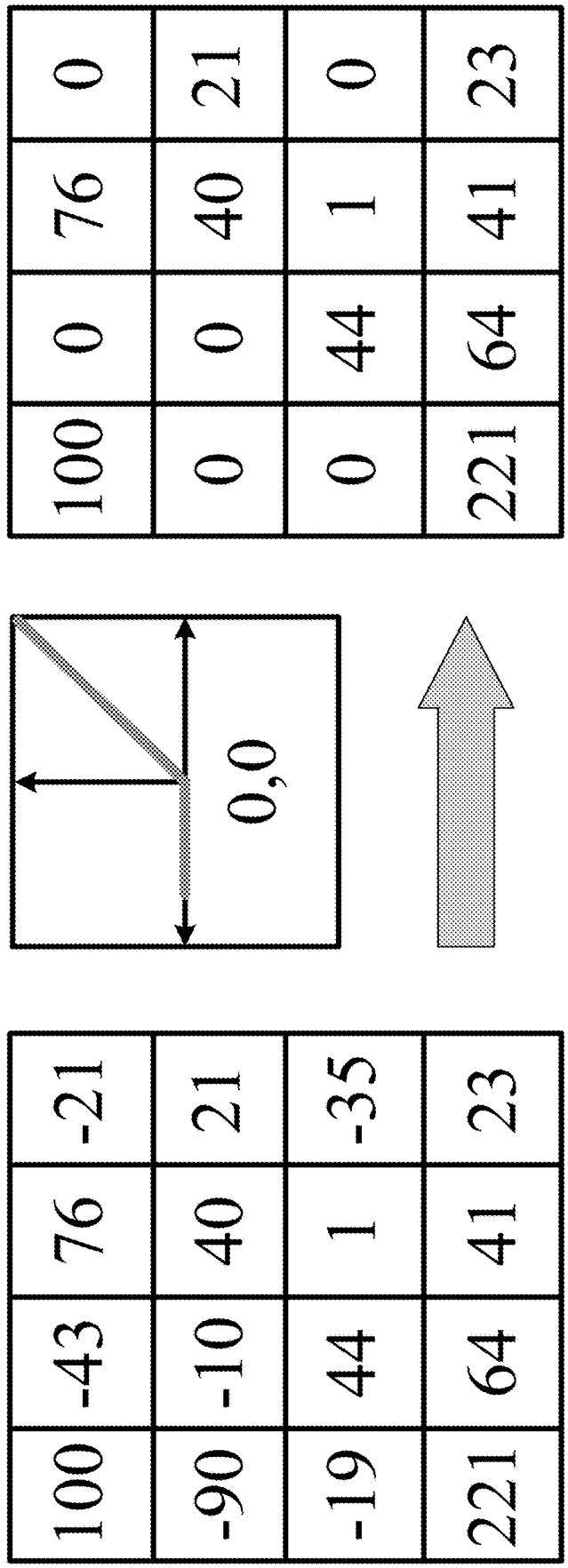
FIG. 5 shows one implementation of a ReLU non-linear layer in accordance with one implementation of the technology disclosed.

FIG. 5 shows one implementation of non-linear layers in accordance with one implementation of the technology disclosed. Non-linear layers use different non-linear trigger functions to signal distinct identification of likely features on each hidden layer. Non-linear layers use a variety of specific functions to implement the non-linear triggering, including the rectified linear units (ReLUs), hyperbolic tangent, absolute of hyperbolic tangent, sigmoid and continuous trigger (non-linear) functions. In one implementation, a ReLU activation implements the function y=max(x, 0) and keeps the input and output sizes of a layer the same. The advantage of using ReLU is that the convolutional neural network is trained many times faster. ReLU is a non-continuous, non-saturating activation function that is linear with respect to the input if the input values are larger than zero and zero otherwise. Mathematically, a ReLU activation function is described as:

$$\varphi(h) = \max(h, 0)$$

$$\varphi(h) = \begin{cases} h \text{ if } h > 0 \\ 0 \text{ if } h \leq 0 \end{cases}$$

In other implementations, the convolutional neural network uses a power unit activation function, which is a continuous, non-saturating function described by:

$\varphi(h) = (a+bh)^c$

In the equation above, a, b and c are parameters controlling the shift, scale and power respectively. The power activation function is able to yield x and y-antisymmetric activation if c is odd and y-symmetric activation if c is even. In some implementations, the unit yields a non-rectified linear activation.

In yet other implementations, the convolutional neural network uses a sigmoid unit activation function, which is a continuous, saturating function described by the following logistic function:

$$\varphi(h) = \frac{1}{1 + e^{-\beta h}}$$

In the equation above, β=1. The sigmoid unit activation function does not yield negative activation and is only antisymmetric with respect to the y-axis.

Dilated Convolutions

Figure 6:
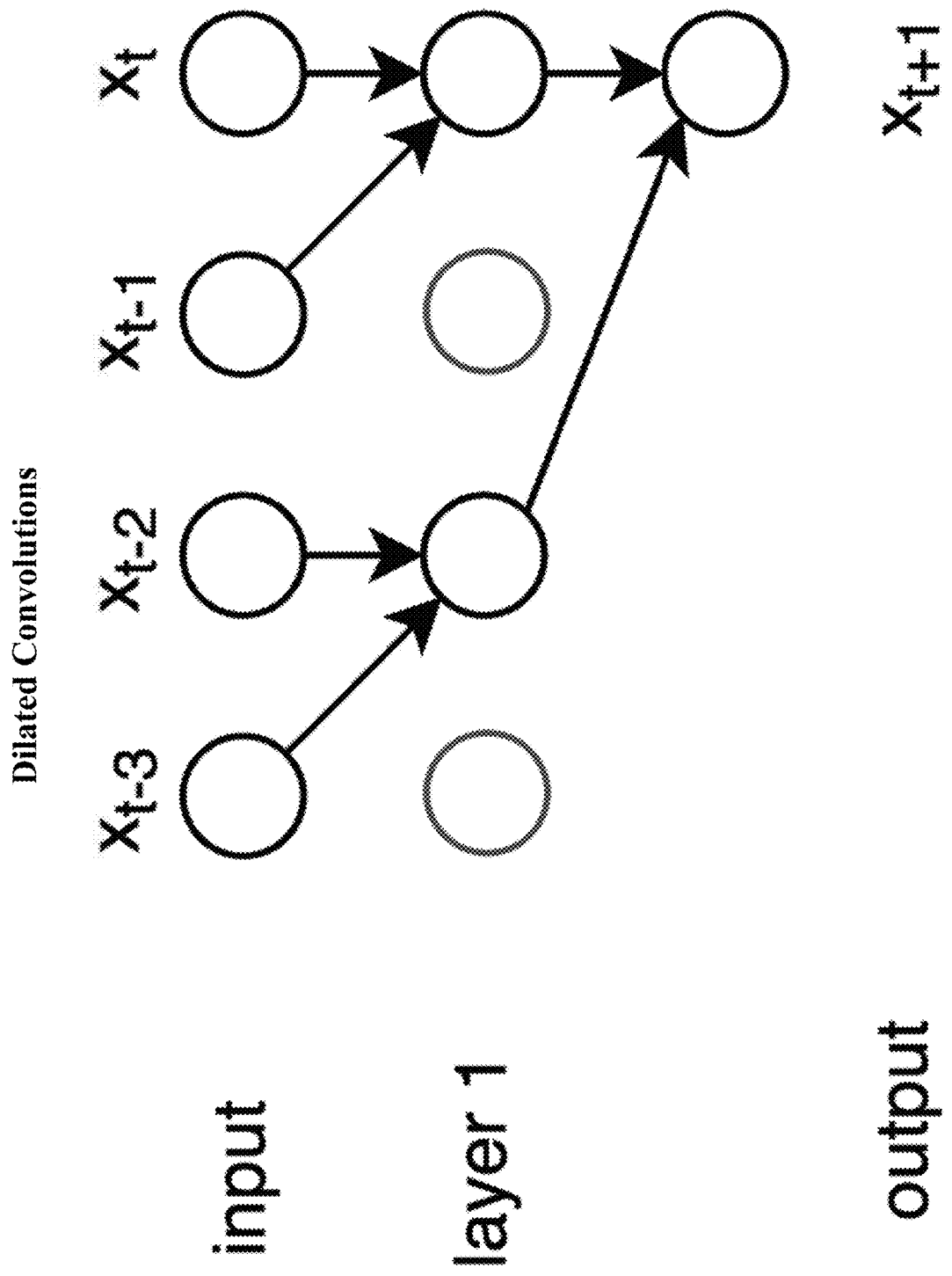
FIG. 6 illustrates dilated convolutions.

FIG. 6 illustrates dilated convolutions. Dilated convolutions, sometimes called atrous convolutions, which literally means with holes. The French name has its origins in the algorithme a trous, which computes the fast dyadic wavelet transform. In these type of convolutional layers, the inputs corresponding to the receptive field of the filters are not neighboring points. This is illustrated in FIG. 6. The distance between the inputs is dependent on the dilation factor.

Sub-Sampling Layers

Figure 7:
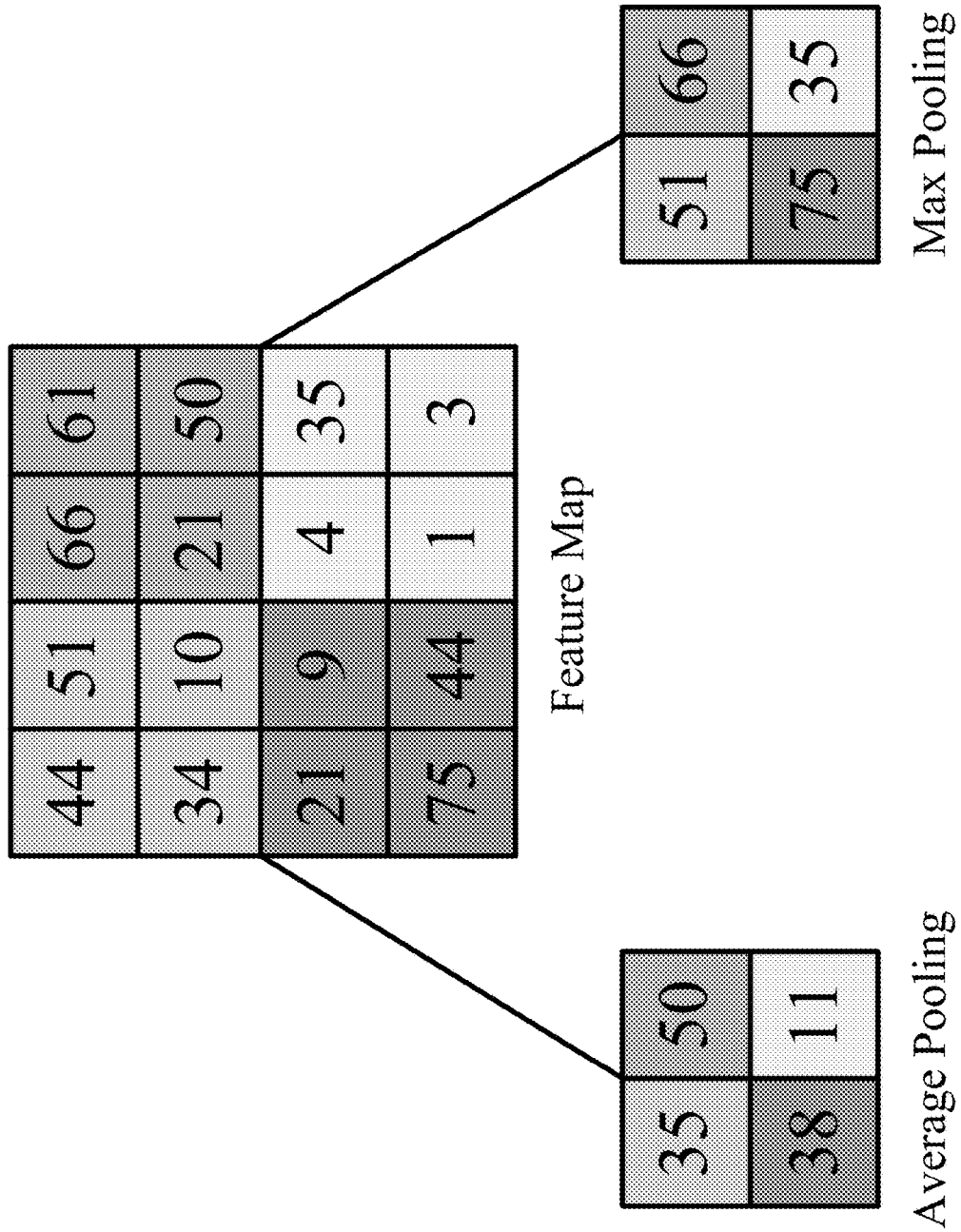
FIG. 7 is one implementation of sub-sampling layers (average/max pooling) in accordance with one implementation of the technology disclosed.

FIG. 7 is one implementation of sub-sampling layers in accordance with one implementation of the technology disclosed. Sub-sampling layers reduce the resolution of the features extracted by the convolution layers to make the extracted features or feature maps-robust against noise and distortion. In one implementation, sub-sampling layers employ two types of pooling operations, average pooling and max pooling. The pooling operations divide the input into non-overlapping two-dimensional spaces. For average pooling, the average of the four values in the region is calculated. For max pooling, the maximum value of the four values is selected.

In one implementation, the sub-sampling layers include pooling operations on a set of neurons in the previous layer by mapping its output to only one of the inputs in max pooling and by mapping its output to the average of the input in average pooling. In max pooling, the output of the pooling neuron is the maximum value that resides within the input, as described by:

$$\varphi_o = \max(\varphi_1, \varphi_2, \ldots \varphi_N)$$

In the equation above, N is the total number of elements within a neuron set.

In average pooling, the output of the pooling neuron is the average value of the input values that reside with the input neuron set, as described by:

$$\varphi_o = \frac{1}{N} \sum_{n=1}^{N} \varphi_n$$

In the equation above, N is the total number of elements within input neuron set.

In FIG. 7, the input is of size 4×4. For 2×2 sub-sampling, a 4×4 image is divided into four non-overlapping matrices of size 2×2. For average pooling, the average of the four values is the whole-integer output. For max pooling, the maximum value of the four values in the 2×2 matrix is the whole-integer output.

Convolution Examples

Figure 8:
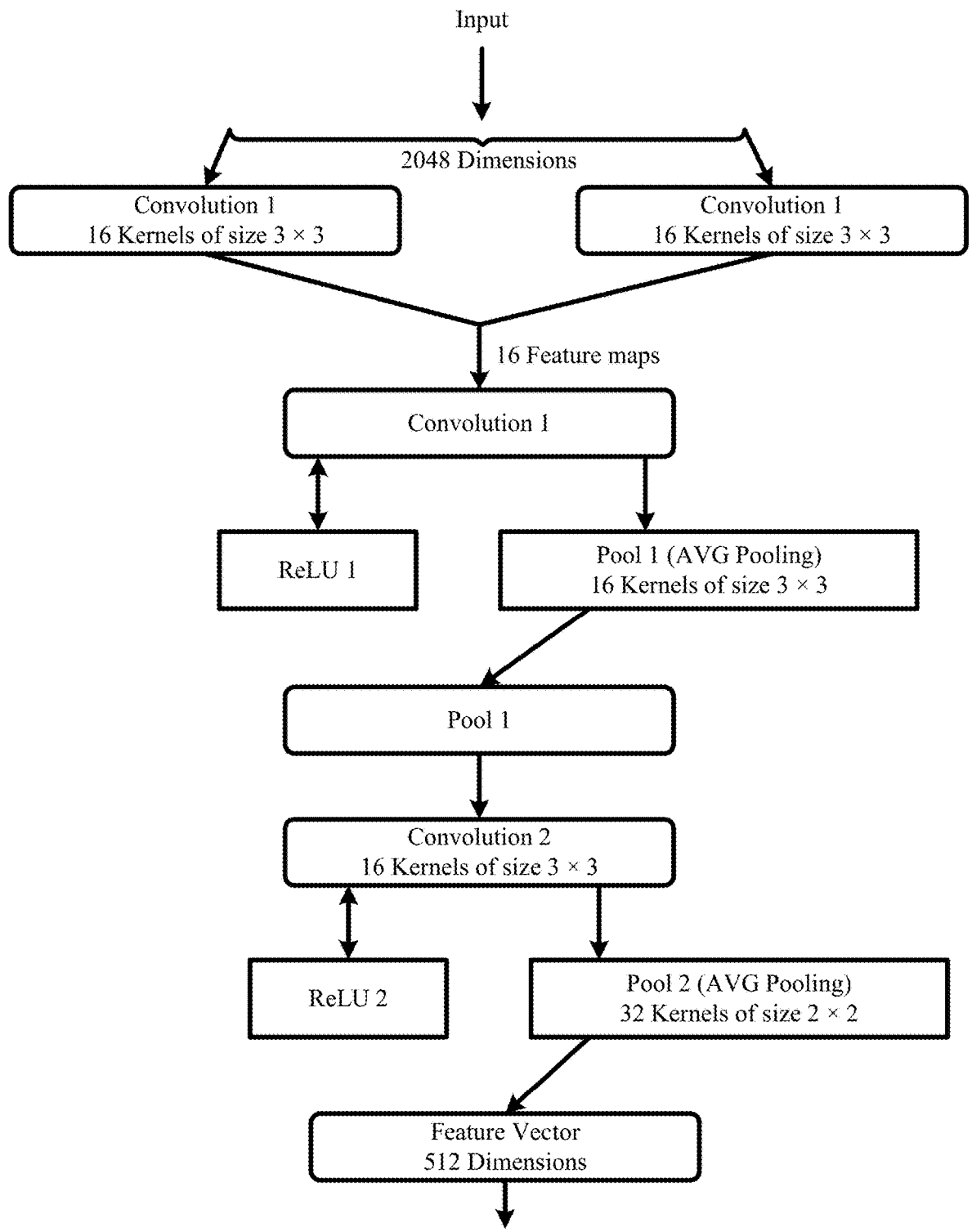
FIG. 8 depicts one implementation of a two-layer convolution of the convolution layers.

FIG. 8 depicts one implementation of a two-layer convolution of the convolution layers. In FIG. 8, an input of size 2048 dimensions is convolved. At convolution 1, the input is convolved by a convolutional layer comprising of two channels of sixteen kernels of size 3×3. The resulting sixteen feature maps are then rectified by means of the ReLU activation function at ReLU1 and then pooled in Pool 1 by means of average pooling using a sixteen channel pooling layer with kernels of size 3×3. At convolution 2, the output of Pool 1 is then convolved by another convolutional layer comprising of sixteen channels of thirty kernels with a size of 3×3. This is followed by yet another ReLU2 and average pooling in Pool 2 with a kernel size of 2×2. The convolution layers use varying number of strides and padding, for example, zero, one, two and three. The resulting feature vector is five hundred and twelve (512) dimensions, according to one implementation.

In other implementations, the convolutional neural network uses different numbers of convolution layers, sub-sampling layers, non-linear layers and fully connected layers. In one implementation, the convolutional neural network is a shallow network with fewer layers and more neurons per layer, for example, one, two or three fully connected layers with hundred (100) to two hundred (200) neurons per layer. In another implementation, the convolutional neural network is a deep network with more layers and fewer neurons per layer, for example, five (5), six (6) or eight (8) fully connected layers with thirty (30) to fifty (50) neurons per layer.

Forward Pass

The output of a neuron of row x, column y in the $l^{th}$ convolution layer and $k^{th}$ feature map for $f$ number of convolution cores in a feature map is determined by the following equation:

$$O_{x,y}^{(l,k)} = \tanh\left(\sum_{t=0}^{f-1}\sum_{r=0}^{k_h}\sum_{c=0}^{k_w} W_{(r,c)}^{(k,t)} O_{(x+r,x+c)}^{(l-1,t)} + Bias^{(l,k)}\right)$$

The output of a neuron of row x, column y in the $l^{th}$ sub-sample layer and $k^{th}$ feature map is determined by the following equation:

$$O_{x,y}^{(l,k)} = \tanh\left(W^{(k)} \sum_{r=0}^{S_h}\sum_{c=0}^{S_w} O_{(x\times S_h+r, y\times S_w+c)}^{(l-1,k)} + Bias^{(l,k)}\right)$$

The output of an $i^{th}$ neuron of the $l^{th}$ output layer is determined by the following equation:

$$O_{(l,i)} = \tanh\left(\sum_{j=0}^{H} O_{(l-1,j)} W_{(i,j)}^{l} + Bias^{(l,i)}\right)$$

Backpropagation

The output deviation of a $k^{th}$ neuron in the output layer is determined by the following equation:

$$d(O_k^o) = y_k - t_k$$

The input deviation of a $k^{th}$ neuron in the output layer is determined by the following equation:

$$d(I_k^o) = (y_k - t_k)\varphi'(v_k) = \varphi'(v_k) d(O_k^o)$$

The weight and bias variation of a $k^{th}$ neuron in the output layer is determined by the following equation:

$$\Delta W_{k,x}^o = d(I_k^o) y_{k,x}$$

$$\Delta Bias_k^o = d(I_k^o)$$

The output bias of a $k^{th}$ neuron in the hidden layer is determined by the following equation:

$$d(O_k^H) = \sum_{i=0}^{i<84} d(I_i^o)W_{i,k}$$

The input bias of a $k^{th}$ neuron in the hidden layer is determined by the following equation:

$$d(I_k^H) = \varphi'(v_k)d(O_k^H)$$

The weight and bias variation in row x, column y in a $m^{th}$ feature map of a prior layer receiving input from k neurons in the hidden layer is determined by the following equation:

$$\Delta W_{m,x,y}^{H,k} = d(I_k^H)y_{x,y}^m$$

$$\Delta \text{Bias}_k^H = d(I_k^H)$$

The output bias of row x, column y in a $m^{th}$ feature map of sub-sample layer S is determined by the following equation:

$$d(O_{x,y}^{S,m}) = \sum_{k}^{170} d(I_{m,x,y}^H)W_{m,x,y}^{H,k}$$

The input bias of row x, column y in a $m^{th}$ feature map of sub-sample layer S is determined by the following equation:

$$d(I_{x,y}^{S,m}) = \varphi'(v_k)d(O_{x,y}^{S,m})$$

The weight and bias variation in row x, column y in a $m^{th}$ feature map of sub-sample layer S and convolution layer C is determined by the following equation:

$$\Delta W^{S,m} = \sum_{x=0}^{fh}\sum_{y=0}^{fw} d(I_{[x/2],[y/2]}^{S,m})O_{x,y}^{C,m}$$

$$\Delta \text{Bias}^{S,m} = \sum_{x=0}^{fh}\sum_{y=0}^{fw} d(O_{x,y}^{S,m})$$

The output bias of row x, column y in a $k^{th}$ feature map of convolution layer C is determined by the following equation:

$$d(O_{x,y}^{C,k}) = d(I_{[x/2],[y/2]}^{S,k})W^k$$

The input bias of row x, column y in a $k^{th}$ feature map of convolution layer C is determined by the following equation:

$$d(I_{x,y}^{C,k}) = \varphi'(v_k)d(O_{x,y}^{C,k})$$

The weight and bias variation in row r, column c in an $m^{th}$ convolution core of a $k^{th}$ feature map of $l^{th}$ convolution layer C:

$$\Delta W_{r,c}^{k,m} = \sum_{x=0}^{fh}\sum_{y=0}^{fw} d(I_{x,y}^{C,k})O_{x+r,y+c}^{l-1,m}$$

$$\Delta \text{Bias}^{C,k} = \sum_{x=0}^{fh}\sum_{y=0}^{fw} d(I_{x,y}^{C,k})$$

Residual Connections

Figure 9:
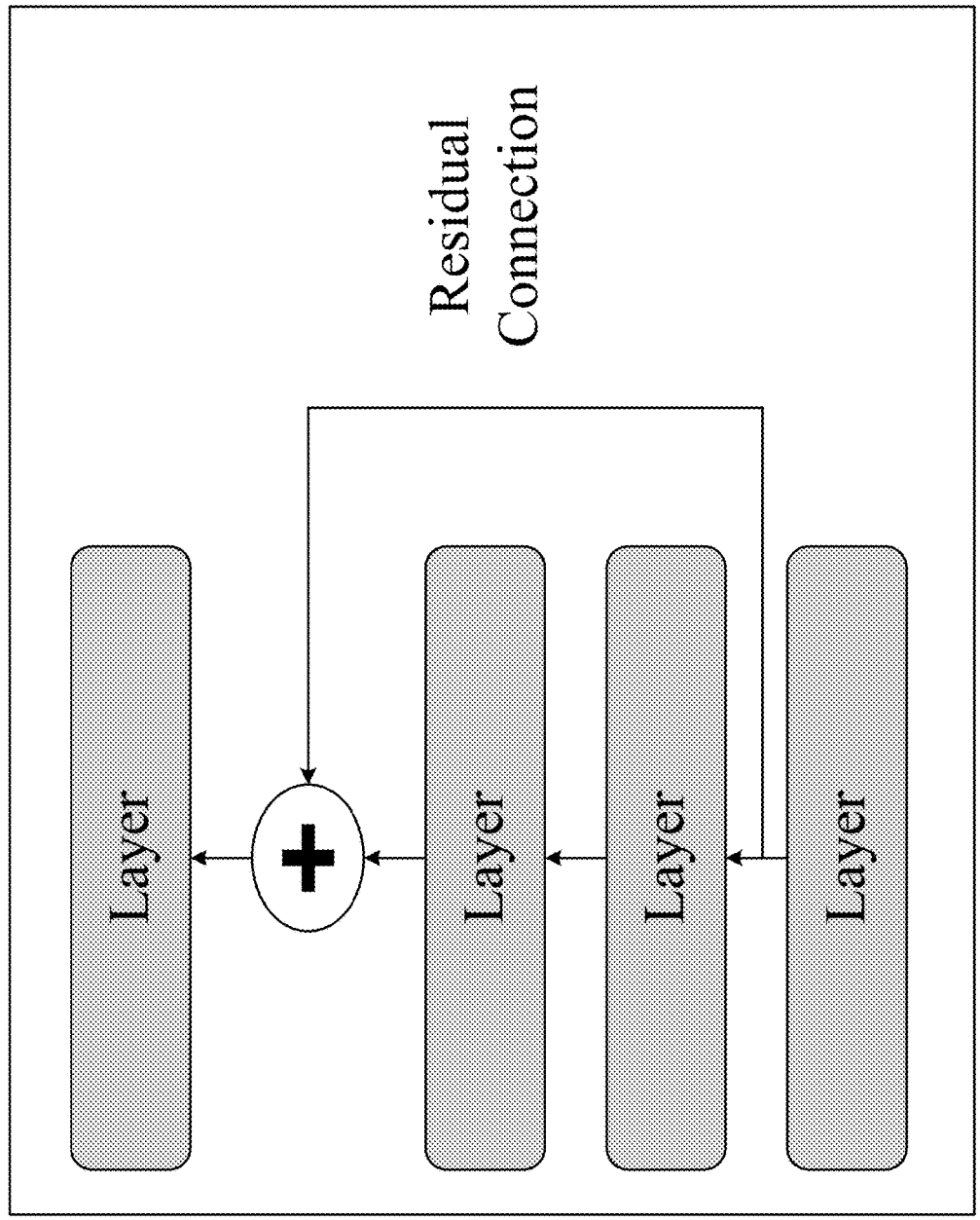
FIG. 9 depicts a residual connection that reinjects prior information downstream via feature-map addition.

FIG. 9 depicts a residual connection that reinjects prior information downstream via feature-map addition. A residual connection comprises reinjecting previous representations into the downstream flow of data by adding a past output tensor to a later output tensor, which helps prevent information loss along the data-processing flow. Residual connections tackle two common problems that plague any large-scale deep-learning model: vanishing gradients and representational bottlenecks. In general, adding residual connections to any model that has more than 10 layers is likely to be beneficial. As discussed above, a residual connection comprises making the output of an earlier layer available as input to a later layer, effectively creating a shortcut in a sequential network. Rather than being concatenated to the later activation, the earlier output is summed with the later activation, which assumes that both activations are the same size. If they are of different sizes, a linear transformation to reshape the earlier activation into the target shape can be used.

Residual Learning and Skip-Connections

Figure 10:
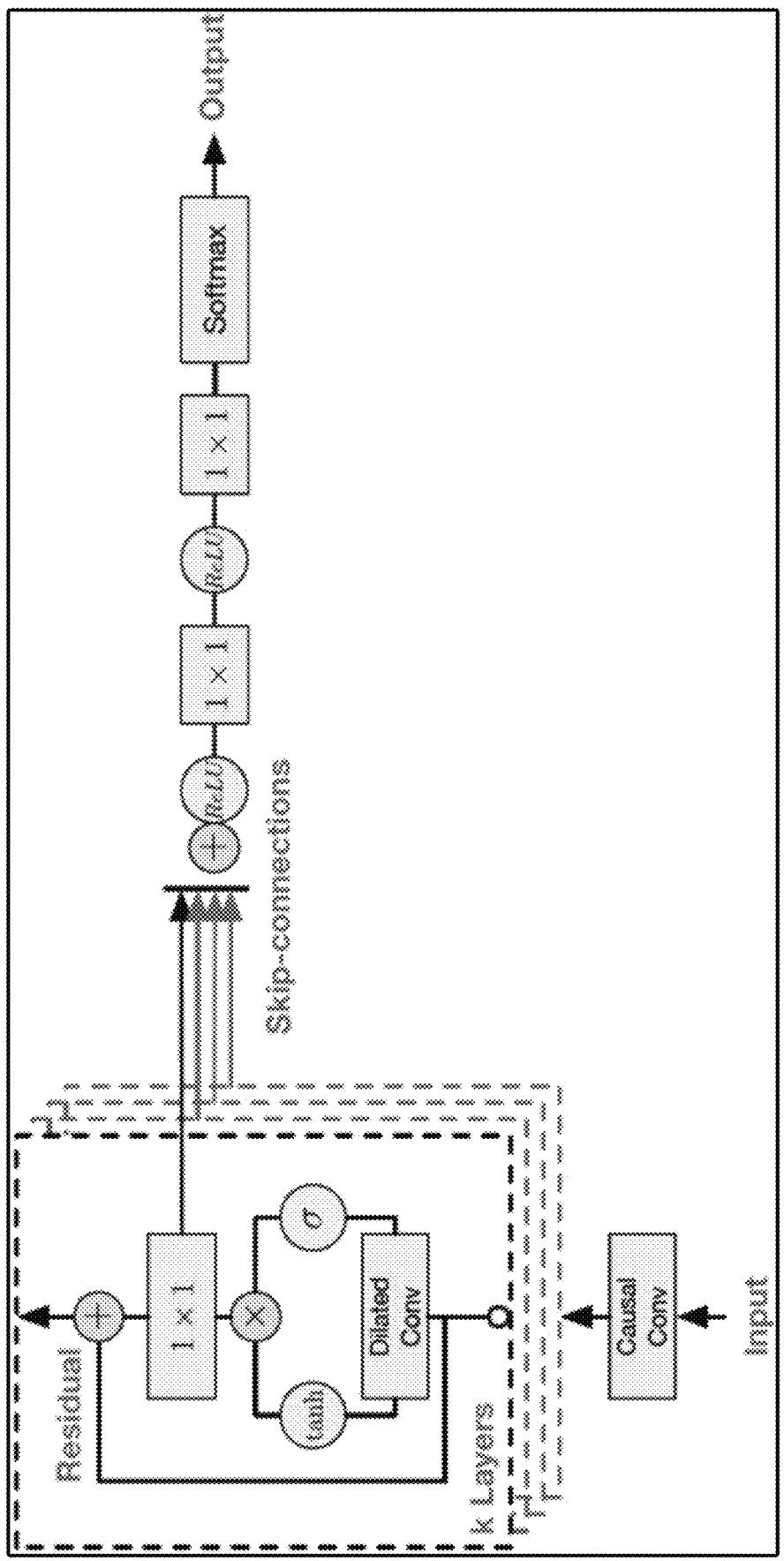
FIG. 10 depicts one implementation of residual blocks and skip-connections.

FIG. 10 depicts one implementation of residual blocks and skip-connections. The main idea of residual learning is that the residual mapping is much easier to be learned than the original mapping. Residual network stacks a number of residual units to alleviate the degradation of training accuracy. Residual blocks make use of special additive skip connections to combat vanishing gradients in deep neural networks. At the beginning of a residual block, the data flow is separated into two streams: the first carries the unchanged input of the block, while the second applies weights and non-linearities. At the end of the block, the two streams are merged using an element-wise sum. The main advantage of such constructs is to allow the gradient to flow through the network more easily.

Benefited from residual network, deep convolutional neural networks (CNNs) can be easily trained and improved accuracy has been achieved for image classification and object detection. Convolutional feed-forward networks connect the output of the $l^{th}$ layer as input to the $(l+1)^{th}$ layer, which gives rise to the following layer transition: $x_l = H_l(x_{l-1})$. Residual blocks add a skip-connection that bypasses the non-linear transformations with an identify function: $x_l = H_l(x_{l-1}) + x_{l-1}$. An advantage of residual blocks is that the gradient can flow directly through the identity function from later layers to the earlier layers. However, the identity function and the output of H, are combined by summation, which may impede the information flow in the network.

WaveNet

The WaveNet is a deep neural network for generating raw audio waveforms. The WaveNet distinguishes itself from other convolutional networks since it is able to take relatively large 'visual fields' at low cost. Moreover, it is able to add conditioning of the signals locally and globally, which allows the WaveNet to be used as a text to speech (TTS) engine with multiple voices, is the TTS gives local conditioning and the particular voice the global conditioning.

Figure 11:
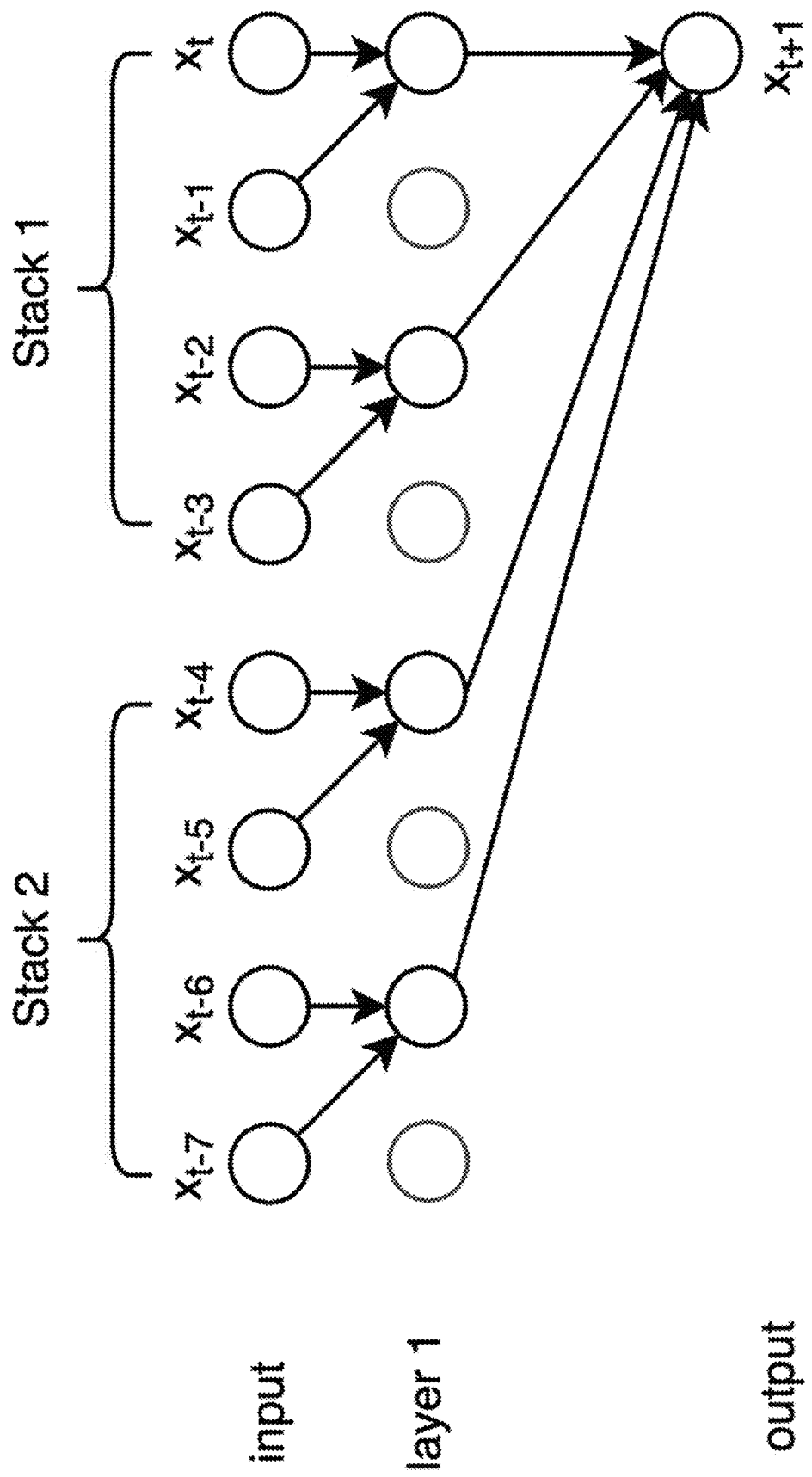
FIG. 11 shows one implementation of stacked dilated convolutions.

The main building blocks of the WaveNet are the causal dilated convolutions. As an extension on the causal dilated convolutions, theWaveNet also allows stacks of these convolutions, as shown in FIG. 11. To obtain the same receptive field with dilated convolutions in this figure, another dilation layer is required. The stacks are a repetition of the dilated convolutions, connecting the outputs of dilated convolution layer to a single output. This enables the WaveNet to get a large 'visual' field of one output node at a relatively low computational cost. For comparison, to get a visual field of 512 inputs, a fully convolutional network (FCN) would require 511 layers. In the case of a dilated convolutional network, we would need eight layers. The stacked dilated convolutions only need seven layers with two stacks or six layers with four stacks. To get an idea of the differences in computational power required for covering the same visual field, the following table shows the number of weights required in the network with the assumption of one filter per layer and a filter width of two. Furthermore, it is assumed that the network is using binary encoding of the 8 bits.

| Network type | No. stacks | No. weights per channel | Total No. of weights |
|---|---|---|---|
| FCN | 1 | $2.6 \cdot 10^5$ | $2.6 \cdot 10^6$ |
| WN | 1 | 1022 | 8176 |
| WN | 2 | 1022 | 8176 |
| WN | 4 | 508 | 4064 |

The WaveNet adds a skip connection before the residual connection is made, which bypasses all the following residual blocks. Each of these skip connections is summed before passing them through a series of activation functions and convolutions. Intuitively, this is the sum of the information extracted in each layer.

Batch Normalization

Batch normalization is a method for accelerating deep network training by making data standardization an integral part of the network architecture. Batch normalization can adaptively normalize data even as the mean and variance change over time during training. It works by internally maintaining an exponential moving average of the batchwise mean and variance of the data seen during training. The main effect of batch normalization is that it helps with gradient propagation—much like residual connections—and thus allows for deep networks. Some very deep networks can only be trained if they include multiple Batch Normalization layers.

Batch normalization can be seen as yet another layer that can be inserted into the model architecture, just like the fully connected or convolutional layer. The BatchNormalization layer is typically used after a convolutional or densely connected layer. It can also be used before a convolutional or densely connected layer. Both implementations can be used by the technology disclosed and are shown in FIG. 15. The BatchNormalization layer takes an axis argument, which specifies the feature axis that should be normalized. This argument defaults to −1, the last axis in the input tensor. This is the correct value when using Dense layers, Conv1D layers, RNN layers, and Conv2D layers with data_format set to "channels_last". But in the niche use case of Conv2D layers with data_format set to "channels_first", the features axis is axis 1; the axis argument in BatchNormalization can be set to 1.

Batch normalization provides a definition for feed-forwarding the input and computing the gradients with respect to the parameters and its own input via a backward pass. In practice, batch normalization layers are inserted after a convolutional or fully connected layer, but before the outputs are fed into an activation function. For convolutional layers, the different elements of the same feature map—i.e. the activations—at different locations are normalized in the same way in order to obey the convolutional property. Thus, all activations in a mini-batch are normalized over all locations, rather than per activation.

The internal covariate shift is the major reason why deep architectures have been notoriously slow to train. This stems from the fact that deep networks do not only have to learn a new representation at each layer, but also have to account for the change in their distribution.

The covariate shift in general is a known problem in the deep learning domain and frequently occurs in real-world problems. A common covariate shift problem is the difference in the distribution of the training and test set which can lead to suboptimal generalization performance. This problem is usually handled with a standardization or whitening preprocessing step. However, especially the whitening operation is computationally expensive and thus impractical in an online setting, especially if the covariate shift occurs throughout different layers.

The internal covariate shift is the phenomenon where the distribution of network activations change across layers due to the change in network parameters during training. Ideally, each layer should be transformed into a space where they have the same distribution but the functional relationship stays the same. In order to avoid costly calculations of covariance matrices to decorrelate and whiten the data at every layer and step, we normalize the distribution of each input feature in each layer across each mini-batch to have zero mean and a standard deviation of one.

Forward Pass

During the forward pass, the mini-batch mean and variance are calculated. With these mini-batch statistics, the data is normalized by subtracting the mean and dividing by the standard deviation. Finally, the data is scaled and shifted with the learned scale and shift parameters. The batch normalization forward pass $f_{BN}$ is depicted in FIG. 12.

In FIG. 12, $\mu_\beta$ is the batch mean and $\sigma_\beta^2$ is the batch variance, respectively. The learned scale and shift parameters are denoted by $\gamma$ and $\beta$, respectively. For clarity, the batch normalization procedure is described herein per activation and omit the corresponding indices.

Since normalization is a differentiable transform, the errors are propagated into these learned parameters and are thus able to restore the representational power of the network by learning the identity transform. Conversely, by learning scale and shift parameters that are identical to the corresponding batch statistics, the batch normalization transform would have no effect on the network, if that was the optimal operation to perform. At test time, the batch mean and variance are replaced by the respective population statistics since the input does not depend on other samples from a mini-batch. Another method is to keep running averages of the batch statistics during training and to use these to compute the network output at test time. At test time, the batch normalization transform can be expressed as illustrated in FIG. 13. In FIG. 13, $\mu_D$ and $\sigma_D^2$ denote the population mean and variance, rather than the batch statistics, respectively.

Backward Pass

Since normalization is a differentiable operation, the backward pass can be computed as depicted in FIG. 14.

Figure 16:
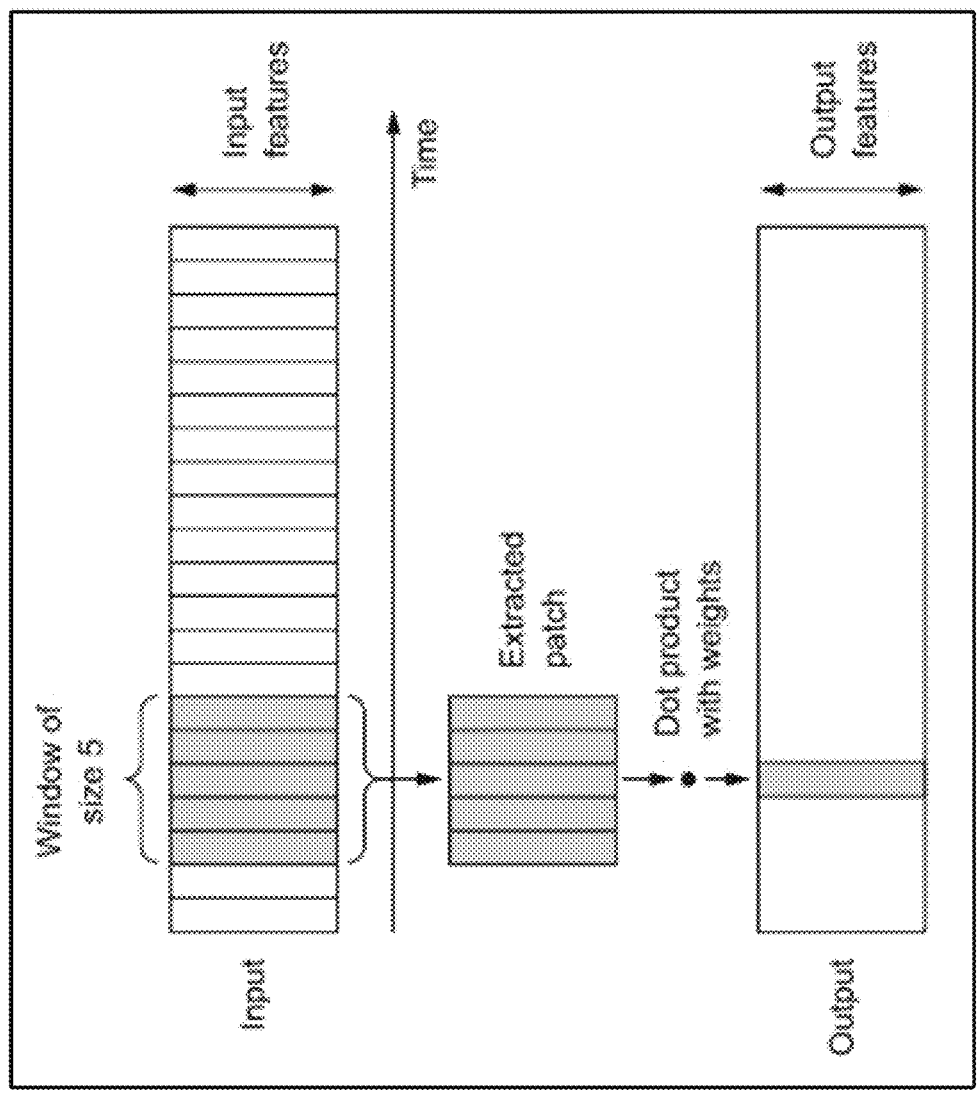
FIG. 16 shows one implementation of 1D convolution.

1D Convolution 1D convolutions extract local 1D patches or subsequences from sequences, as shown in FIG. 16. 1D convolution obtains each output timestep from a temporal patch in the input sequence. 1D convolution layers recognize local patters in a sequence. Because the same input transformation is performed on every patch, a pattern learned at a certain position in the input sequences can be later recognized at a different position, making 1D convolution layers translation invariant for temporal translations. For instance, a 1D convolution layer processing sequences of bases using convolution windows of size 5 should be able to learn bases or base sequences of length 5 or less, and it should be able to recognize the base motifs in any context in an input sequence. A base-level 1D convolution is thus able to learn about base morphology.

Global Average Pooling

FIG. 17 illustrates how global average pooling (GAP) works. Global average pooling can be use used to replace fully connected (FC) layers for classification, by taking the spatial average of features in the last layer for scoring. The reduces the training load and bypasses overfitting issues. Global average pooling applies a structural prior to the model and it is equivalent to linear transformation with predefined weights. Global average pooling reduces the number of parameters and eliminates the fully connected layer. Fully connected layers are typically the most parameter and connection intensive layers, and global average pooling provides much lower-cost approach to achieve similar results. The main idea of global average pooling is to generate the average value from each last layer feature map as the confidence factor for scoring, feeding directly into the softmax layer.

Global average pooling have three benefits: (1) there are no extra parameters in global average pooling layers thus overfitting is avoided at global average pooling layers; (2) since the output of global average pooling is the average of the whole feature map, global average pooling will be more robust to spatial translations; and (3) because of the huge number of parameters in fully connected layers which usually take over 50% in all the parameters of the whole network, replacing them by global average pooling layers can significantly reduce the size of the model, and this makes global average pooling very useful in model compression.

Global average pooling makes sense, since stronger features in the last layer are expected to have a higher average value. In some implementations, global average pooling can be used as a proxy for the classification score. The feature maps under global average pooling can be interpreted as confidence maps, and force correspondence between the feature maps and the categories. Global average pooling can be particularly effective if the last layer features are at a sufficient abstraction for direct classification; however, global average pooling alone is not enough if multilevel features should be combined into groups like parts models, which is best performed by adding a simple fully connected layer or other classifier after the global average pooling.

Module:

As used herein, the term "module" refers to a processor that receives information characterizing input data and generates an alternative representation and/or characterization of the input data. A neural network is an example of a module. Other examples of a module include a multilayer perceptron, a feed-forward neural network, a recursive neural network, a recurrent neural network, a deep neural network, a shallow neural network, a fully-connected neural network, a sparsely-connected neural network, a convolutional neural network that comprises a fully-connected neural network, a fully convolutional network without a fully-connected neural network, a deep stacking neural network, a deep belief network, a residual network, echo state network, liquid state machine, highway network, maxout network, long short-term memory (LSTM) network, recursive neural network grammar (RNNG), gated recurrent unit (GRU), pre-trained and frozen neural networks, and so on. Yet other examples of a module include individual components of a convolutional neural network, such as a one-dimensional (1D) convolution module, a two-dimensional (2D) convolution module, a three-dimensional (3D) convolution module, a feature extraction module, a dimensionality reduction module, a pooling module, a subsampling module, a batch normalization module, a concatenation module, a classification module, a regularization module, and so on. In implementations, a module comprises learnable submodules, parameters, and hyperparameters that can be trained by back-propagating the errors using an optimization algorithm. The optimization algorithm can be based on stochastic gradient descent (or other variations of gradient descent like batch gradient descent and mini-batch gradient descent). Some examples of optimization algorithms used by the technology disclosed include Momentum, Nesterov accelerated gradient, Adagrad, Adadelta, RMSprop, and Adam. In implementations, a module is an activation module that applies a non-linearity function. Some examples of non-linearity functions used by the technology disclosed include a sigmoid function, rectified linear units (ReLUs), hyperbolic tangent function, absolute of hyperbolic tangent function, leaky ReLUs (LReLUs), and parametrized ReLUs (PReLUs). In implementations, a module is a classification module. Some examples of classifiers used by the technology disclosed include a multi-class support vector machine (SVM), a Softmax classifier, and a multinomial logistic regressor. Other examples of classifiers used by the technology disclosed include a rule-based classifier. In implementations, a module is a pre-processing module, such as an input module, a normalization module, a patch-extraction module, and a noise-addition module. In implementations, a module is a post-processing module, such as an output module, an estimation module, and a modelling module. Two modules differ in "type" if they differ in at least one submodule, parameter, or hyperparameter. In some implementations, certain modules are fixed topology modules in which a certain set of submodules are not evolved/modified and/or only evolved/modified in certain generations, and only the interconnections and interconnection weights between the submodules are evolved.

Any other conventional or future-developed neural networks or components thereof or used therein, are considered to be modules. Such implementations will be readily apparent to those skilled in the art without departing from the spirit and scope of the technology disclosed.

Submodule:

As used herein, the term "submodule" refers to a processing element of a module. For example, in the case of a fully-connected neural network, a submodule is a neuron of the neural network. In another example, a layer of neurons, i.e., a neuron layer, is considered a submodule of the fully-connected neural network module. In other examples, in the case of a convolutional neural network, a kernel, a filter, a feature extractor, an activation function, a pooling operation, a subsampling operation, and a regularization operation, are each considered submodules of the convolutional neural network module. In some implementations, the submodules are considered as modules, and vice-versa.

A system implementation of the technology disclosed includes one or more processors coupled to the memory. The memory is loaded with computer instructions which, when executed on the processors, cause evolution of a deep neural network structure.

The deep neural network structure disclosed herein includes a plurality of modules and interconnections among the modules. Examples of deep neural network structures include:
   AlexNet
   ResNet
   Inception
   WaveNet
   PixelCNN
   GoogLeNet
   ENet U-Net
BN-NIN
VGG
LeNet
DeepSEA
DeepChem
DeepBind
DeepMotif
FIDDLE
DeepLNC
DeepCpG
DeepCyTOF
SPINDLE

What is claimed is:

1. A computer-implemented method of cloud-based speech recognition from audio channels without prior training to adapt to speaker(s) in the audio channels, the method including:
  accessing a machine-learning engine;
  submitting hundreds of speech samples to multiple speech recognition engines, and analyzing how transcription error rates of the speech recognition engines vary with sound and speech characteristics of the speech samples;
  receiving an audio channel and qualifying the speech recognition engines as capable of transcribing the audio channel and/or its parts, taking into account at least a recording codec of the audio channel, available transcoding from the recording codec to a speech recognition engine supported codec, a length of the audio channel, and a language of the audio channel;
  applying an audio channel analyzer to the audio channel to characterize audio fidelity, background noise, concurrent speech by multiple speakers, timbre, pitch, and audio distortion of the audio channel; and
  using the machine learning engine, selecting a speech recognition engine that is qualified as capable of transcribing the audio channel and/or its parts or a transcoded version of the audio channel and/or its parts, based on a combination of least three of the following characteristics:
  audio fidelity;
  background noise;
  concurrent speech by multiple users;
  timbre;
  pitch; and
  audio distortion of the audio channel.

2. The computer-implemented method of claim 1, further including:
  using the multiple speech recognition engines on the audio channel, including using the speech recognition engines sequentially when a first speech recognition engine reports a low confidence score on some or all of its transcription.

3. The computer-implemented method of claim 1, further including:
  using the multiple speech recognition engines on all or separate parts of the audio channel, including using the speech recognition engines when voting on transcription results is used, when different speakers on different tracks of the audio channel, and when different speakers take turns during segments of the audio channel.

4. The computer-implemented method of claim 1, further including applying the method to separation/identification (diarization) engines.

5. The computer-implemented method of claim 1, further including applying the method to auto-punctuation engines.

6. The computer-implemented method of claim 1, further including applying a silence analyzer to the speech samples and the audio channel prior to submission to parse out silent parts of speech.

7. The computer-implemented method of claim 1, further including performing testing periodically, including daily, weekly, or monthly, wherein the testing comprises the submitting of hundreds of speech samples to multiple speech recognition engines, and the analyzing of how transcription error rates of the speech recognition engines vary with sound and speech characteristics of the speech samples.

8. A computer-implemented method of cloud-based speech recognition from audio channels without prior training to adapt to speaker(s) in the audio channels, the method including:
  accessing a machine-learning engine;
  submitting thousands of speech samples to multiple speech recognition engines, and analyzing how transcription error rates of the speech recognition engines vary with sound and speech characteristics of the speech samples;
  receiving an audio channel and qualifying the speech recognition engines as capable of transcribing the audio channel and/or its parts, taking into account at least a recording codec of the audio channel, available transcoding from the recording codec to a speech recognition engine supported codec, a length of the audio channel, and a language of the audio channel;
  applying an audio channel analyzer to the audio channel to characterize audio fidelity, background noise, concurrent speech by multiple speakers, timbre, pitch, and audio distortion of the audio channel; and
  using the machine learning engine, selecting a speech recognition engine that is qualified as capable of transcribing the audio channel and/or its parts or a transcoded version of the audio channel and/or its parts, based on a combination of at least three of the following characteristics:
  audio fidelity;
  background noise;
  concurrent speech by multiple users;
  timbre;
  pitch; and
  audio distortion of the audio channel.

9. A computer-implemented method of cloud-based speech recognition from audio channels without prior training to adapt to speaker(s) in the audio channels, the method including:
  accessing a machine-learning engine;
  submitting dozens of speech samples to multiple speech recognition engines, and analyzing how transcription error rates of the speech recognition engines vary with sound and speech characteristics of the speech samples;
  receiving an audio channel and qualifying the speech recognition engines as capable of transcribing the audio channel and/or its parts, taking into account at least a recording codec of the audio channel, available transcoding from the recording codec to a speech recognition engine supported codec, a length of the audio channel, and a language of the audio channel;
  applying an audio channel analyzer to the audio channel to characterize audio fidelity, background noise, concurrent speech by multiple speakers, timbre, pitch, and audio distortion of the audio channel; and
  using the machine learning engine, selecting a speech recognition engine that is qualified as capable of transcribing the audio channel and/or its parts or a transcoded version of the audio channel and/or its parts, based on a combination of at least three of the following characteristics:

audio fidelity;
background noise;
concurrent speech by multiple users;
timbre;
pitch; and
audio distortion of the audio channel.

10. A system for cloud-based speech recognition from audio channels without prior training to adapt to speaker(s) in the audio channels, comprising:
- a machine-learning engine trained to process speech samples;
- an analyzer for submitting and analyzing submitting hundreds of speech samples to multiple speech recognition engines, the analyzer determining error rates of the speech recognition engines based on sound and speech characteristics of the speech samples;
- the analyzer including receiving an audio channel and qualifying the speech recognition engines as capable of transcribing the audio channel and/or its parts, taking into account at least a recording codec of the audio channel, available transcoding from the recording codec to a speech recognition engine supported codec, a length of the audio channel, and a language of the audio channel;
- applying an audio channel analyzer to the audio channel to characterize audio fidelity, background noise, concurrent speech by multiple speakers, timbre, pitch, and audio distortion of the audio channel; and
- using the machine learning engine to select a speech recognition engine that is qualified as capable of transcribing the audio channel and/or its parts or a transcoded version of the audio channel and/or its parts based a combination of at least three of the following characteristics:
audio fidelity;
background noise;
concurrent speech by multiple users;
timbre;
pitch; and
audio distortion of the audio channel.

11. The computer-implemented method of claim 1, wherein the selecting of a qualified speech recognition engine is based on a combination of least four of the following characteristics:
audio fidelity;
background noise;
concurrent speech by multiple users;
timbre;
pitch; and
audio distortion of the audio channel.

12. The computer-implemented method of claim 11, further including:
using the multiple speech recognition engines on the audio channel, including using the speech recognition engines sequentially when a first speech recognition engine reports a low confidence score on some or all of its transcription.

13. The computer-implemented method of claim 11, further including:
using the multiple speech recognition engines on all or separate parts of the audio channel, including using the speech recognition engines when voting on transcription results is used, when different speakers on different tracks of the audio channel, and when different speakers take turns during segments of the audio channel.

14. The computer-implemented method of claim 11, further including applying the method to auto-punctuation engines.

15. The computer-implemented method of claim 11, further including applying a silence analyzer to the speech samples and the audio channel prior to submission to parse out silent parts of speech.

16. The computer-implemented method of claim 11, further including performing testing periodically, including daily, weekly, or monthly, wherein the testing comprises the submitting of hundreds of speech samples to multiple speech recognition engines, and the analyzing of how transcription error rates of the speech recognition engines vary with sound and speech characteristics of the speech samples.

* * * * *

UNITED STATES PATENT AND TRADEMARK OFFICE
CERTIFICATE OF CORRECTION

PATENT NO. : 11,315,570 B2  
APPLICATION NO. : 16/373503  
DATED : April 26, 2022  
INVENTOR(S) : Shamir Allibhai Page 1 of 1

It is certified that error appears in the above-identified patent and that said Letters Patent is hereby corrected as shown below:

In the Claims

Column 31, Line 41, Claim 1, delete "of least" and insert -- of at least --.

Column 33, Line 33, Claim 10, delete "based a combination" and insert -- based on a combination --.

Column 34, Line 3, Claim 11, delete "of least" and insert -- of at least --.

Signed and Sealed this  
Twenty-first Day of June, 2022

Katherine Kelly Vidal  
*Director of the United States Patent and Trademark Office*